United States Patent
Roherty et al.

(10) Patent No.: US 12,222,212 B2
(45) Date of Patent: Feb. 11, 2025

(54) SYSTEMS AND METHODS FOR PREDICTING ESTIMATED TIME OF ARRIVAL

(71) Applicant: Schneider Enterprise Resources, LLC, Green Bay, WI (US)

(72) Inventors: Matt Roherty, Green Bay, WI (US); Jaime Wilson, Green Bay, WI (US); Brendt Peeters, Green Bay, WI (US)

(73) Assignee: Schneider Enterprise Resources, LLC, Green Bay, WI (US)

( * ) Notice: Subject to any disclaimer, the term of this patent is extended or adjusted under 35 U.S.C. 154(b) by 37 days.

(21) Appl. No.: 17/182,675

(22) Filed: Feb. 23, 2021

(65) Prior Publication Data

US 2021/0262817 A1    Aug. 26, 2021

Related U.S. Application Data

(60) Provisional application No. 62/980,887, filed on Feb. 24, 2020.

(51) Int. Cl.
*G01C 21/36* (2006.01)
*G01C 21/34* (2006.01)
*G01S 17/58* (2006.01)

(52) U.S. Cl.
CPC ....... *G01C 21/3617* (2013.01); *G01C 21/343* (2013.01); *G01C 21/3614* (2013.01); *G01S 17/58* (2013.01)

(58) Field of Classification Search
None
See application file for complete search history.

(56) References Cited

U.S. PATENT DOCUMENTS

| | | |
|---|---|---|
| 5,848,396 A | 12/1998 | Gerace |
| 6,919,807 B2 | 7/2005 | Shek et al. |
| 7,466,232 B2 | 12/2008 | Neuwirth |
| 7,831,384 B2 | 11/2010 | Bill |
| 8,355,936 B2 | 1/2013 | Altaf et al. |

(Continued)

FOREIGN PATENT DOCUMENTS

| | | |
|---|---|---|
| AU | 2002305375 A8 | 11/2002 |
| AU | 2002337921 A8 | 4/2003 |

(Continued)

OTHER PUBLICATIONS

A. T. Baptista, E. P. Bouillet and P. Pompey, "Towards an uncertainty aware short-term travel time prediction using GPS bus data: Case study in Dublin," 2012 15th International IEEE Conference on Intelligent Transportation Systems, Anchorage, AK, USA, 2012, pp. 1620-1625 (Year: 2012).*

(Continued)

*Primary Examiner* — Tuan C To
*Assistant Examiner* — David Ruben Pedersen
(74) *Attorney, Agent, or Firm* — FOLEY & LARDNER LLP

(57) ABSTRACT

A system and method compute a transit time for travel of a vehicle from a first site to a second site. The system and method include determining a dwell time at the second site, computing an initial predicted transit estimated time of arrival of the vehicle based on the dwell time and the transit time, and updating the initial predicted transit estimated time of arrival based upon a user workflow.

26 Claims, 5 Drawing Sheets

(56) References Cited

U.S. PATENT DOCUMENTS

| | | | |
|---|---|---|---|
| 8,604,943 | B2 | 12/2013 | Adelson |
| 9,070,295 | B2 | 6/2015 | Adelson |
| 9,082,097 | B1 | 7/2015 | Adelson |
| 9,082,098 | B1 | 7/2015 | Adelson |
| 9,087,313 | B1 | 7/2015 | Adelson |
| 9,140,570 | B1 | 9/2015 | Baird |
| 9,377,319 | B2 | 6/2016 | San Filippo et al. |
| 9,651,392 | B2 | 5/2017 | Gearhart et al. |
| 9,921,070 | B1 | 3/2018 | Nimchuk et al. |
| 10,433,915 | B2 | 10/2019 | Isaacs et al. |
| 10,441,367 | B2 | 10/2019 | Isaacs et al. |
| 11,017,347 | B1 | 5/2021 | Choudhury et al. |
| 11,460,315 | B2 | 10/2022 | Beaurepaire et al. |
| 2003/0018701 | A1 | 1/2003 | Kaestle et al. |
| 2003/0093756 | A1 | 5/2003 | Behzadi et al. |
| 2003/0126554 | A1 | 7/2003 | Behzadi et al. |
| 2005/0253704 | A1 | 11/2005 | Neuwirth |
| 2005/0253725 | A1 | 11/2005 | Neuwirth et al. |
| 2005/0258937 | A1 | 11/2005 | Neuwirth |
| 2009/0237253 | A1 | 9/2009 | Neuwirth |
| 2012/0056758 | A1 | 3/2012 | Kuhlman et al. |
| 2012/0253892 | A1* | 10/2012 | Davidson ........... G06Q 10/0631 705/7.42 |
| 2014/0132767 | A1 | 5/2014 | Sonnabend et al. |
| 2017/0325403 | A1 | 11/2017 | Dennis |
| 2018/0080776 | A1* | 3/2018 | Nimchuk ........... G01C 21/3415 |
| 2019/0226862 | A1* | 7/2019 | Shaukat ................. G07C 5/008 |
| 2019/0360832 | A1 | 11/2019 | Emory et al. |
| 2019/0390971 | A1* | 12/2019 | Shaginyan ........ G01C 21/3492 |
| 2020/0030041 | A1 | 1/2020 | Isaacs et al. |
| 2020/0030042 | A1 | 1/2020 | Isaacs et al. |
| 2020/0034969 | A1 | 1/2020 | Isaacs et al. |
| 2020/0126321 | A1 | 4/2020 | Swearingen |
| 2020/0200562 | A1 | 6/2020 | Vereshchagin et al. |
| 2020/0240803 | A1 | 7/2020 | Rao et al. |
| 2020/0265721 | A1 | 8/2020 | Haugh et al. |
| 2020/0410861 | A1 | 12/2020 | Nellros et al. |
| 2021/0142670 | A1* | 5/2021 | Kamiya ................. G08G 1/127 |
| 2021/0217311 | A1 | 7/2021 | Sullivan et al. |

FOREIGN PATENT DOCUMENTS

| | | | | |
|---|---|---|---|---|
| AU | 2003215349 | A1 | 9/2004 | |
| AU | 2017268213 | | 11/2018 | |
| CA | 2448991 | | 11/2002 | |
| CA | 2464133 | | 4/2003 | |
| CA | 2464116 | | 5/2003 | |
| CA | 3024323 | | 11/2017 | |
| DE | 102019005062 | A1 * | 1/2021 | ........... G01C 21/343 |
| EP | 1 390 864 | | 2/2004 | |
| EP | 1 436 727 | | 7/2004 | |
| EP | 1 497 940 | | 1/2005 | |
| EP | 2 461 136 | A1 | 6/2012 | |
| EP | 3 457 935 | | 3/2019 | |
| WO | WO-02/091598 | | 11/2002 | |
| WO | WO-03/034638 | | 4/2003 | |
| WO | WO-03/040953 | A1 | 5/2003 | |
| WO | WO-2004/007281 | | 1/2004 | |
| WO | WO-2004/072847 | A1 | 8/2004 | |
| WO | WO-2014168556 | A1 * | 10/2014 | ........... G01C 21/343 |
| WO | WO-2016/141366 | A1 | 9/2016 | |
| WO | WO-2017/201015 | | 11/2017 | |

OTHER PUBLICATIONS

Bergman, Jeff, "FourKites buys yard management suite from TrackX Solutions" Logistics Management, Mar. 25, 2020 (2020), https://www.logisticsmgmt.com/article/fourkites_buys_yard_management_suite_from_trackx_solutions.

Canada Stock Watch, "TKX TrackX to sell yard mgmt software to FourKites" Factiva, Mar. 25, 2020 (2020).

Globenewswire, "FourKites Releases Integrated Dynamic Yard Offering; #1 supply chain visibility platform delivers the new product in an accelerated time frame to meet rising market demand for agility and end-to-end visibility" GlobeNewswire, Jul. 29, 2020 (2020).

Johnson, Eric, "Acquisition expands FourKites' freight visibility to the yard" Journal of Commerce, Mar. 25, 2020 (2020), https://www.joc.com/sites/default/files/field_feature_image/shutterstock_266612801.jpg.

Lamkin, Aaron, "TrackX Completes Sale of Yard Management Business to FourKites?" TrackX, Mar. 25, 2020 (2020), https://trackx.com/trackx-completes-sale-of-yard-management-business-to-fourkites/.

Market News Publishing "FourKites(R) Acquires TrackX Yard Solutions to Create Dynamic Yard the Industry's First Real Time Yard Management and Visibility Solution" Market News Publishing, Mar. 25, 2020 (2020).

Straight, Brian, "FourKites officially releases Dynamic Yard solution" Freight Waves, Jul. 29, 2020 (2020), https://www.freightwaves.com/news/fourkites-officially-releases-dynamic-yard-solution.

Supplychainbrain, "FourKites Releases Integrated Dynamic Yard Offering" SupplyChainBrain, Aug. 3, 2020 (2020), https://www.supplychainbrain.com/articles/31698-fourkites-releases-integrated-dynamic-yard-offering.

Trackx Holdings Inc "TrackX Completes Sale of Yard Management Business to FourKites?" GlobeNewswire, Mar. 25, 2020 (2020), https://www.globenewswire.com/news-release/2020/03/25/2006424/0/en/TrackX-Completes-Sale-of-Yard-Management-Business-to-FourKites.html.

Trackx Holdings Inc, "Interim Consolidated Financial Statements For the Three Months Ended Dec. 31, 2019 and 2018" Westlaw, Dec. 31, 2019 (2019).

Trackx Holdings Inc, "Management's Discussion and Analysis For the Three and Six Months Ended Mar. 31, 2019" Westlaw, Mar. 31, 2019 (2019).

Trackx Holdings Inc, "Management's Discussion and Analysis For the Three and Six Months Ended Mar. 31, 2020" Westlaw, Mar. 31, 2020 (2020).

Trackx Holdings Inc, "TrackX Completes Sale of Yard Management Business to FourKites" Westlaw, Mar. 24, 2020 (2020).

Trackx Holdings Inc, "TrackX Holdings Inc. Consolidated Financial Statements For the Years Ended Sep. 30, 2019 and 2018" Westlaw, Sep. 30, 2019 (2019).

Trackx Holdings Inc, "TrackX Holdings Inc. Management's Discussion and Analysis For the year Ended Sep. 30, 2019" Westlaw, Sep. 30, 2019 (2019).

Trackx Holdings Inc, "TrackX Reports First Quarter of Fiscal 2020" Westlaw, May 6, 2020 (2020).

TrackX Holdings Inc, "TrackX Reports Q4 and Fiscal 2019 Financial Results" Westlaw, Apr. 14, 2020 (2020).

TrackX Holdings Inc, "TrackX Reports Second Quarter of Fiscal 2020" Westlaw, Jun. 8, 2020 (2020).

PC Miller, MileOn, https://mileonapp.com/, Dec. 3, 2019, 2 pages.

Trucker Path, Most Popular App for Truckers, https://truckerpath.com/trucker-path-app/, Feb. 22, 2020, 6 pages.

* cited by examiner

SYSTEMS AND METHODS FOR PREDICTING ESTIMATED TIME OF ARRIVAL

CROSS-REFERENCE TO RELATED APPLICATIONS

This application claims the benefit of and priority to U.S. Provisional Application No. 62/980,887, filed on Feb. 24, 2020, the entirety of which is incorporated by reference herein.

BACKGROUND

Many applications rely on accurate predictions of estimated time of arrival at a destination site. However, conventional mechanisms of computing estimated time of arrival are limited in the way those mechanisms are configured and how they operate.

SUMMARY

The systems, methods, and devices of this disclosure each have several innovative aspects, no single one of which is solely responsible for all of the desirable attributes disclosed herein.

Various aspects of the disclosure may now be described with regard to certain examples and embodiments, which are intended to illustrate but not limit the disclosure. Although the examples and embodiments described herein may focus on, for the purpose of illustration, specific systems and processes, one of skill in the art may appreciate the examples are illustrative only, and are not intended to be limiting.

In accordance with some embodiments of the present disclosure, a method is disclosed. The method includes computing a transit time for travel of a vehicle from a first site to a second site, determining a dwell time at the second site, computing an initial predicted transit estimated time of arrival of the vehicle based on the dwell time and the transit time, and updating the initial predicted transit estimated time of arrival based upon a user workflow of a user of the vehicle.

In accordance with some other embodiments of the present disclosure, a non-transitory computer-readable media having computer-readable instructions stored thereon is disclosed. The computer-readable instructions when executed by a processor causes the processor to compute a transit time for travel of a vehicle from a first site to a second site, determine a dwell time at the second site, compute an initial predicted transit estimated time of arrival of the vehicle based on the dwell time and the transit time, and update the initial predicted transit estimated time of arrival of the vehicle based upon a user workflow of a user of the vehicle.

In accordance with yet other embodiments of the present disclosure, a system is disclosed. The system includes a memory having computer-readable instructions stored thereon and a processor that executes the computer-readable instructions to compute a transit time for travel of a vehicle from a first site to a second site, determine a dwell time at the second site, compute an initial predicted transit estimated time of arrival of the vehicle based on the dwell time and the transit time, and update the initial predicted transit estimated time of arrival of the vehicle based upon a user workflow of a user of the vehicle.

The foregoing summary is illustrative only and is not intended to be in any way limiting. In addition to the illustrative aspects, embodiments, and features described above, further aspects, embodiments, and features may become apparent by reference to the following drawings and the detailed description.

Figure 1:
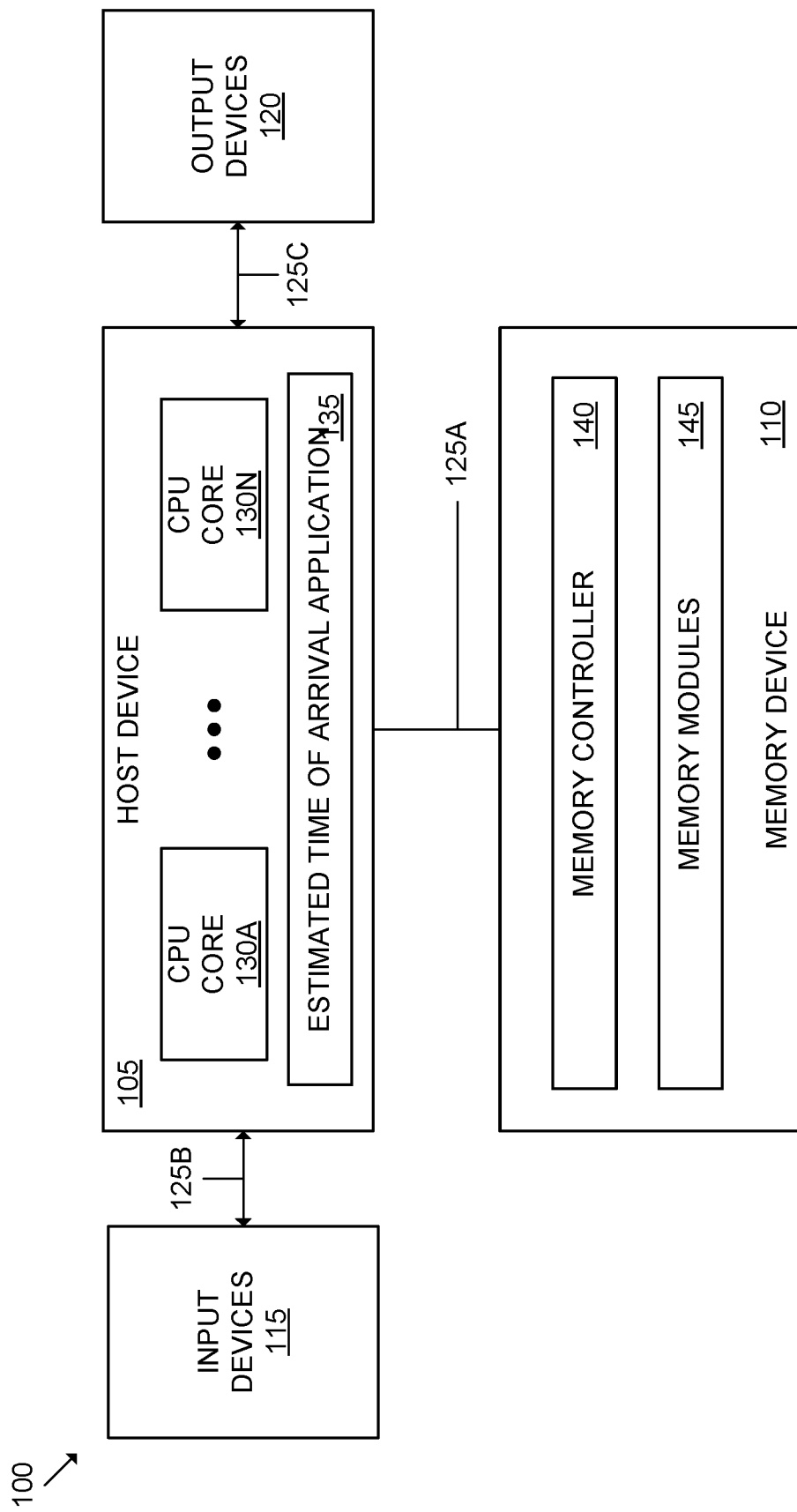
FIG. 1 is an example block diagram of a computing system implementing an estimated time of arrival application, in accordance with some embodiments of the present disclosure.

The foregoing and other features of the present disclosure may become apparent from the following description and appended claims, taken in conjunction with the accompanying drawings. Understanding that these drawings depict only several embodiments in accordance with the disclosure and are therefore, not to be considered limiting of its scope, the disclosure may be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It may be readily understood that the aspects of the present disclosure, as generally described herein, and illustrated in the figures, may be arranged, substituted, combined, and designed in a wide variety of different configurations, all of which are explicitly contemplated and made part of this disclosure.

Current systems of determining estimated time of arrival lack the ability to weigh and leverage current shipment estimates into decisions for future shipments. For example, if a shipment is late based on a current estimated time of arrival, future shipment estimates and delivery decisions cannot be adjusted to account for the late previous shipment. Additionally, drivers working on delivery routes, such as truck drivers making a delivery of a shipment, are mandated not to work more than a legal limit of hours of service (HoS). Current systems of predicting estimates of deliveries and shipments do not consume a value of HoS for a driver. In such systems, the time a driver is legally required to stop working and take a break from a delivery route cannot be determined to use in evaluating estimated time of arrival of future shipments and improving driver utilization. As such, improving the predicted estimated time of arrival for drivers may greatly save companies resources and improve client relationships by having on-time deliveries.

The present disclosure provides mechanisms to calculate an estimated time of arrival at a destination site based on driver workflow and historical data. In some embodiments, in a scenario in which a delivery route includes a numerous number of stops or transit legs, improving the accuracy of the estimated time of arrival at the destination site is desirable. Error from missing the estimated time or arrival at a particular transit leg may continue downstream and may expound the error in the estimated time of arrival at the final destination site, causing scheduled delivery appointments to potentially be missed and/or poor utilization of drivers. The present disclosure also provides mechanisms to calculate an accurate estimate time of arrival at each transit leg, and updates the estimated time of arrivals at downstream transit legs based upon information received from previous transit legs.

Specifically, the present disclosure provides an estimated time of arrival application having an estimated time of arrival engine configured to compute an estimated time of arrival for travel from a first site to a second site. In some embodiments, the estimated time of arrival engine may determine an initial transit time between the first site and the second site. The estimated time of arrival engine may also be configured to determine a dwell time at the second site indicative of how much time a truck driver/vehicle may spend at the second site. Based on the initial transit time and the dwell time, the estimated time of arrival engine may compute an initial predicted transit estimated time of arrival at the second site. In some embodiments, the estimated time of arrival engine may also consider driver workflow such as hours of service, break time, appointment start and end times, leeway time, etc. to update the initial predicted transit estimated time of arrival. Thus, the estimated time of arrival engine not only computes an estimated time of arrival based upon distance and road conditions (e.g., traffic, weather, etc.), the estimated time of arrival also considers various variable factors that may impact the estimated time of arrival at the second site. The estimated time of arrival engine may use past data to predict future data, as further described below.

While the present disclosure discusses freight moved in trucks, it is to be understood that the present disclosure may be used with respect to any vehicles, including train, air (planes/helicopters), intermodal (combination of transportation modes, such as truck and train), etc.

Referring now to FIG. 1, an example block diagram of a computing system 100 is shown, in accordance with some embodiments of the present disclosure. The computing system 100 includes a host device 105 associated with a memory device 110. The host device 105 may be configured to receive input from one or more input devices 115 and provide output to one or more output devices 120. The host device 105 may be configured to communicate with the memory device 110, the input devices 115, and the output devices 120 via appropriate interfaces or channels 125A, 125B, and 125C, respectively. The computing system 100 may be implemented in a variety of computing devices such as computers (e.g., desktop, laptop, etc.), tablets, personal digital assistants, mobile devices, wearable computing devices such as smart watches, other handheld or portable devices, or any other computing unit suitable for performing operations described herein using the host device 105.

Further, some or all of the features described in the present disclosure may be implemented on a client device, a server device, or a cloud/distributed computing environment, or a combination thereof. Additionally, unless otherwise indicated, functions described herein as being performed by a computing device (e.g., the computing system 100) may be implemented by multiple computing devices in a distributed environment, and vice versa. In some embodiments, the computing system 100 or at least some of the features described herein may be implemented in an in-vehicle system (e.g., tablet) that may be configured to perform at least some of the estimated time of arrivals computations described herein and report those out to a server while, in other embodiments, the server may perform the calculations (e.g., using driver behavior and/or other data obtained from the in-vehicle system and/or other systems).

The input devices 115 may include any of a variety of input technologies such as a keyboard, stylus, touch screen, mouse, track ball, keypad, microphone, voice recognition, motion recognition, remote controllers, input ports, one or more buttons, dials, joysticks, and any other input peripheral that is associated with the host device 105 and that allows an external source, such as a user, to enter information (e.g., data) into the host device and send instructions to the host device 105. Similarly, the output devices 120 may include a variety of output technologies such as external memories, printers, speakers, displays, microphones, light emitting diodes, headphones, plotters, speech generating devices, video devices, global positioning systems, and any other output peripherals that are configured to receive information (e.g., data) from the host device 105. The "data" that is either input into the host device 105 and/or output from the host device may include any of a variety of textual data, graphical data, video data, sound data, position data, combinations thereof, or other types of analog and/or digital data that is suitable for processing using the computing system 100.

The host device 105 may include one or more Central Processing Unit ("CPU") cores or processors 130A-130N that may be configured to execute instructions for running one or more applications associated with the host device 105. In some embodiments, the instructions and data needed to run the one or more applications may be stored within the memory device 110. The host device 105 may also be configured to store the results of running the one or more applications within the memory device 110. One such application on the host device 105 may include an estimated time of arrival application 135. The estimated time of arrival application 135 may be executed by one or more of the CPU cores 130A-130N. The instructions to execute the estimated time of arrival application 135 may be stored within the memory device 110. The estimated time of arrival application 135 is described in greater detail below. Thus, the host device 105 may be configured to request the memory device 110 to perform a variety of operations. For example, the host device 105 may request the memory device 110 to read data, write data, update or delete data, and/or perform management or other operations.

To facilitate communication with the memory device 110, the memory device 110 may include or be associated with a memory controller 140. Although the memory controller 140 is shown as being part of the memory device 110, in some embodiments, the memory controller 140 may instead be part of the host device 105 or another element of the computing system 100 and operatively associated with the memory device 110. The memory controller 140 may be configured as a logical block or circuitry that receives instructions from the host device 105 and performs operations in accordance with those instructions. For example, when the execution of the estimated time of arrival application 135 is desired, the host device 105 may send a request to the memory controller 140. The memory controller 140 may read the instructions associated with the estimated time of arrival application 135 that are stored within the memory device 110, and send those instructions back to the host device. In some embodiments, those instructions may be temporarily stored within a memory on the host device 105. One or more of the CPU cores 130A-130N may then execute those instructions by performing one or more operations called for by those instructions of the estimated time of arrival application 135.

The memory device 110 may include one or more memory circuits 145 that store data and instructions. The memory circuits 145 may be any of a variety of memory types, including a variety of volatile memories, non-volatile memories, or a combination thereof. For example, in some embodiments, one or more of the memory circuits 145 or portions thereof may include NAND flash memory cores. In other embodiments, one or more of the memory circuits 145 or portions thereof may include NOR flash memory cores, Static Random Access Memory (SRAM) cores, Dynamic Random Access Memory (DRAM) cores, Magnetoresistive Random Access Memory (MRAM) cores, Phase Change Memory (PCM) cores, Resistive Random Access Memory (ReRAM) cores, 3D XPoint memory cores, ferroelectric random-access memory (FeRAM) cores, and other types of memory cores that are suitable for use within the memory device 110. In some embodiments, one or more of the memory circuits 145 or portions thereof may be configured as other types of storage class memory ("SCM"). Generally speaking, the memory circuits 145 may include any of a variety of Random Access Memory (RAM), Read-Only Memory (ROM), Programmable ROM (PROM), Erasable PROM (EPROM), Electrically EPROM (EEPROM), hard disk drives, flash drives, memory tapes, cloud memory, or any combination of primary and/or secondary memory that is suitable for performing the operations described herein.

It is to be understood that only some components of the computing system 100 are shown and described in FIG. 1. However, the computing system 100 may include other components such as various batteries and power sources, networking interfaces, routers, switches, external memory systems, controllers, etc. Generally speaking, the computing system 100 may include any of a variety of hardware, software, and/or firmware components that are needed or considered desirable in performing the functions described herein. Similarly, the host device 105, the input devices 115, the output devices 120, and the memory device 110, including the memory controller 140 and the memory circuits 145, may include hardware, software, and/or firmware components that are considered necessary or desirable in performing the functions described herein. In addition, in certain embodiments, the memory device 110 may integrate some or all of the components of the host device 105, including, for example, the CPU cores 130A-130N, and the CPU cores may be configured to execute the estimated time of arrival application 135, as described herein.

Figure 2:
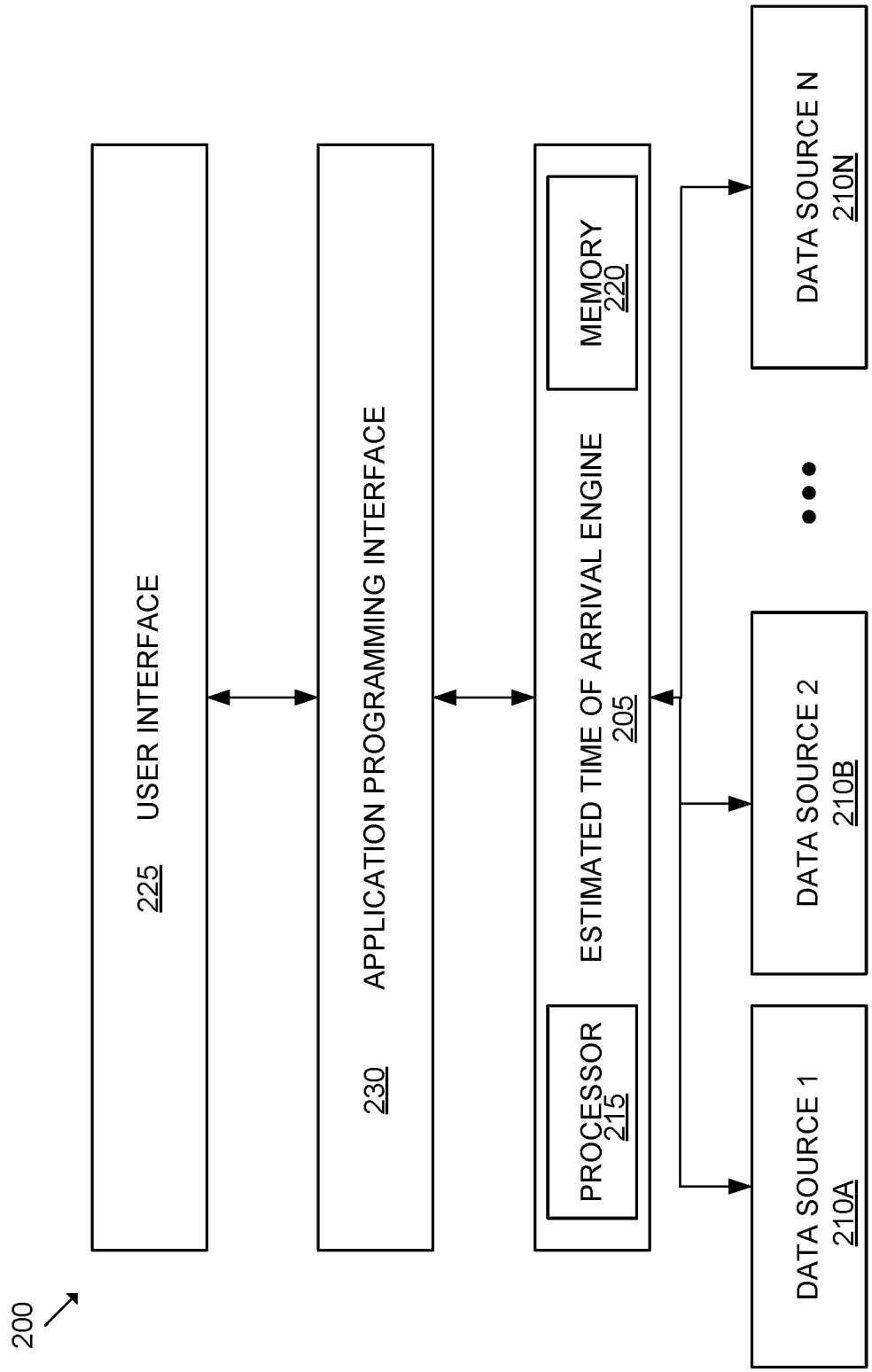
FIG. 2 is an example block diagram showing additional details of the estimated time of arrival application of FIG. 1, in accordance with some embodiments of the present disclosure.

Turning now to FIG. 2, an example estimated time of arrival application 200 is shown, in accordance with some embodiments of the present disclosure. The estimated time of arrival application 200 may be used to make estimated time of arrival predictions via an estimated time of arrival engine 205 that receives data from one or more data sources 210A-210N. The estimated time of arrival engine 205 may include or be associated with a processor 215 (e.g., similar to the CPU cores 130A-130N) and a memory 220 (e.g., similar to the memory device 110). Although not shown, the estimated time of arrival engine 205 may include or be associated with other types of software, hardware, firmware, or combinations thereof that may be needed or considered desirable to have in the estimated time of arrival engine for performing the functions described herein.

The estimated time of arrival application 200 may also include a user interface 225 that serves as the front end of the estimated time of arrival application. In some embodiments, the estimated time of arrival engine 205 may be accessed through the user interface 225 via an Application Programming Interface ("API") 230. Specifically, to access the estimated time of arrival engine 205 via the user interface 225 using the API 230, a user may use designated devices such as laptops, desktops, tablets, mobile devices, other handheld or portable devices, and/or other types of computing devices that are configured to access the API. In some embodiments, these devices may be different from the computing device on which the estimated time of arrival application 200 is installed. In other embodiments, the estimated time of arrival application 200 may be hosted on a cloud service and may be accessed through the cloud via a web or mobile application.

In some embodiments, the user may access the user interface 225/the estimated time of arrival engine 205 via a web browser, upon entering a uniform resource locator ("URL") for the API 230 such as the IP address of the estimated time of arrival application 200 or other designated web address. In some embodiments, the user interface 225/the estimated time of arrival engine 205 may be accessed via a mobile application downloaded to a mobile device. In other embodiments, the user interface 225/the estimated time of arrival engine 205 may be configured for access in other ways. In some embodiments, the user of the estimated time of arrival application 200 may be a truck driver driving a vehicle (e.g., a truck) to receive or to drop off freight at a destination site. In other embodiments, the user of the estimated time of arrival application 200 may be an operator at the destination site to monitor the arrival of the truck driver/vehicle. In yet other embodiments, the user of the estimated time of arrival application 200 may be a manager or other personnel associated with the truck driver (e.g., the company employing the truck driver, company owning the vehicle, etc.) interested in monitoring the arrival of the truck driver/vehicle at the destination. In other embodiments, a user of the estimated time of arrival application 200 may be an in house logistics management team of a customer, third party supply chain management firms, and/or logistics management firms that may be interested in arrival and departure information of shipments or vehicles. Generally speaking, the user may be any person or entity that is interested in accurately predicting and monitoring the estimated time of arrival of the truck driver/vehicle. Although the present disclosure has been described in the context of truck drivers, it is to be understood that the present disclosure may be applicable in other applications where accurate predicting/monitoring of estimated times of arrival is desired.

Further, upon accessing the user interface 225/the estimated time of arrival engine 205, users may send instructions to the estimated time of arrival engine via the user interface and receive information back from the estimated time of arrival engine, also via the user interface. Thus, the user interface 225 facilitates human-computer interaction between the users and the estimated time of arrival engine 205. In some embodiments, the user interface 225 may present a graphical user interface ("GUI") to a user to receive input from and provide output to the user. The GUI may present a variety of graphical icons, windows, visual indicators, menus, visual widgets, and other indicia to facilitate user interaction. In other embodiments, the user interface 225 may be configured as other types of user interfaces. Further, the user interface 225 may be configured to receive user inputs in a variety of ways. In some embodiments, the user interface 225 may be configured to receive user inputs via the input devices 115. In other embodiments, the user interface 225 may be configured to receive the user inputs in other ways. The user interface 225 may also be configured to present outputs/information to the users in a variety of ways. In some embodiments, the user interface 225 may present outputs to the user via the output devices 120. In other embodiments, the user interface 225 may be configured to present the outputs in other ways (e.g., audible or visual alarms, etc.). Generally speaking, the user interface 225 may be associated with any type of hardware, software, and/or firmware component that enables the estimated time of arrival application 200 to perform the functions described herein.

Further, in some embodiments, the API 230 that is used to communicate with the estimated time of arrival engine 205 via the user interface 225 may be a representational state transfer ("REST") type of API. In other embodiments, the API 230 may be any other type of web or other type of API (e.g., ASP.NET) built using any of a variety of technologies, such as Java, .Net, etc., that is suitable for facilitating communication between the estimated time of arrival engine 205 and the users via the user interface 225. In some embodiments, the API 230 may be configured to facilitate communication via a hypertext transfer protocol ("HTTP") or hypertext transfer protocol secure ("HTTPS") type request. The API 230 may receive an HTTP/HTTPS request and send an HTTP/HTTPS response back. In other embodiments, the API 230 may be configured to facilitate communication using other or additional types of communication protocols.

It is to be understood that only some components of the estimated time of arrival application 200 are shown and described in FIG. 2. However, the estimated time of arrival application 200 may include or be associated with any of a variety of hardware, software, and/or firmware components that are needed or considered desirable in performing the functions described herein.

Referring still to FIG. 2 and as indicated above, the estimated time of arrival engine 205 receives input from the data sources 210A-210N. The number of the data sources 210A-210N from which the estimated time of arrival engine 205 receives input may vary from one embodiment to another. For example, although at least three data sources (e.g., the data source 210A, the data source 210B, and the data source 210N) are shown in FIG. 2, in other embodiments, fewer than or greater than three data sources may be used. Further, in some embodiments, each of the data sources 210A-210N may be configured to provide a designated type of input data to the estimated time of arrival engine 205. For example, in some embodiments, one or more of the data sources 210A-210N may include driver profile information. Driver profile data that may be collected and stored in one or more of the data sources 210A-210N may include driver name, driver demographics, driving history, a team driver status, a student status, a LoS, a BU, overrides allowed, tenure, a team logic value, a student logic value, a normal start time, a normal end time, a normal break length, a driver's individual accuracy based on variance to actual times, delays in actualizing activity, false and/or not precise actuals, a "Not Available Before" time, and any other information pertaining to the driver that may be needed or considered desirable to have. The driver profile information may be utilized by the estimated time of arrival application 200 to analyze behaviors of drivers to improve a prediction of the estimated time of arrival. Additionally, one or more of the data sources 210A-210N may store actual, "soft actuals," and predicted arrival/departing data. For example, when an update is received from a user device of a driver that the driver has arrived at a delivery location, this update of actual arrival information can be stored in a designated data source.

In some embodiments, one or more of the data sources 210A-210N may be dedicated to storing and updating driver itinerary information that is constantly generated for a full fleet of vehicles. For example, one or more of the data sources 210A-210N may be dedicated to storing data of a primary itinerary table. A series of queries may be leveraged to flatten out a plan for a driver's trip from a series of stops to a series of transits. As such, resulting data on the driver's itinerary may be stored in one or more of the data sources 210A-210N as a series of transits rather than a series of stops. For example, instead of A, B, C as stops, the data may be transformed into *-A2, A2-B1, B1-B2, B2-B3, B3-C1, and so on, where after the first translation, there is a second translation that chains the shipments for the driver into the same pairs, replacing the * with the previous location. The resulting data of the planned route may then be stored in a linear format within one or more of the data sources 210A-210N.

One or more of the data sources 210A-210N may be configured to store dwell time data. For example, data from actual times of arrivals/departures within a transportation management system (TMS) may be used to identify realistic activity times for stop actions. This stored data can then be used to generate estimated activity time per leg of service and activity. In some embodiments, the estimated time of arrival application 200 may store dwell time data if the dwell time data indicates a dwell period greater than 5 minutes and less than 10 hours. In some embodiments, the stored dwell time data may be paired with a driver specific values and a commodity value to indicate which driver created that dwell time data and what type of delivery the dwell time was associated with when it was collected. The dwell time data may include the time the dwell time data was received to help categorize whether the dwell time data occurred within the past 12 hours, within the past 24 hours, and/or within the past 90 days, for example. The dwell time data in other embodiments, may include other or additional information.

One or more of the data sources 210A-210N may also include stored and categorized data on transit information. For example, one of the data sources 210N may include saved data received from one or more third party vendors or services that may be used in predicting an estimated transit time from one stop to another stop. In some embodiments, one or more of the data sources 210A-210N may also be configured to store data relating to collecting tracking events information, current truck telemetry information, current truck assignments information, current driver assignments information, HoS recaps with RAIR, near real-time HoS information, HR demographic information of the drivers, return to work (RTW) ship information, trailing unit information, order management system information (e.g., customer order management (COM) information), TMS information and so on. The estimated time of arrival application 200 may access the TMS and order management system information, as well as other supporting data stored in the data sources 210A-210N, to execute extract, transform, and load (ETL) processes to generate and updated predicted transit estimated time of arrivals of delivery routes. Notwithstanding the data sources 210A-210N described herein, those data sources may be used to store/provide to the estimated time of arrival engine 205 other or additional types of data that may be needed or considered useful to have in performing the functions described herein.

Based upon the inputs received from the data sources 210A-210N, the estimated time of arrival engine 205 predicts an initial estimated time of arrival and continuously updates the initial predictions based upon information received from the data sources 210A-210N, as described below in FIGS. 3-5.

Figure 3:
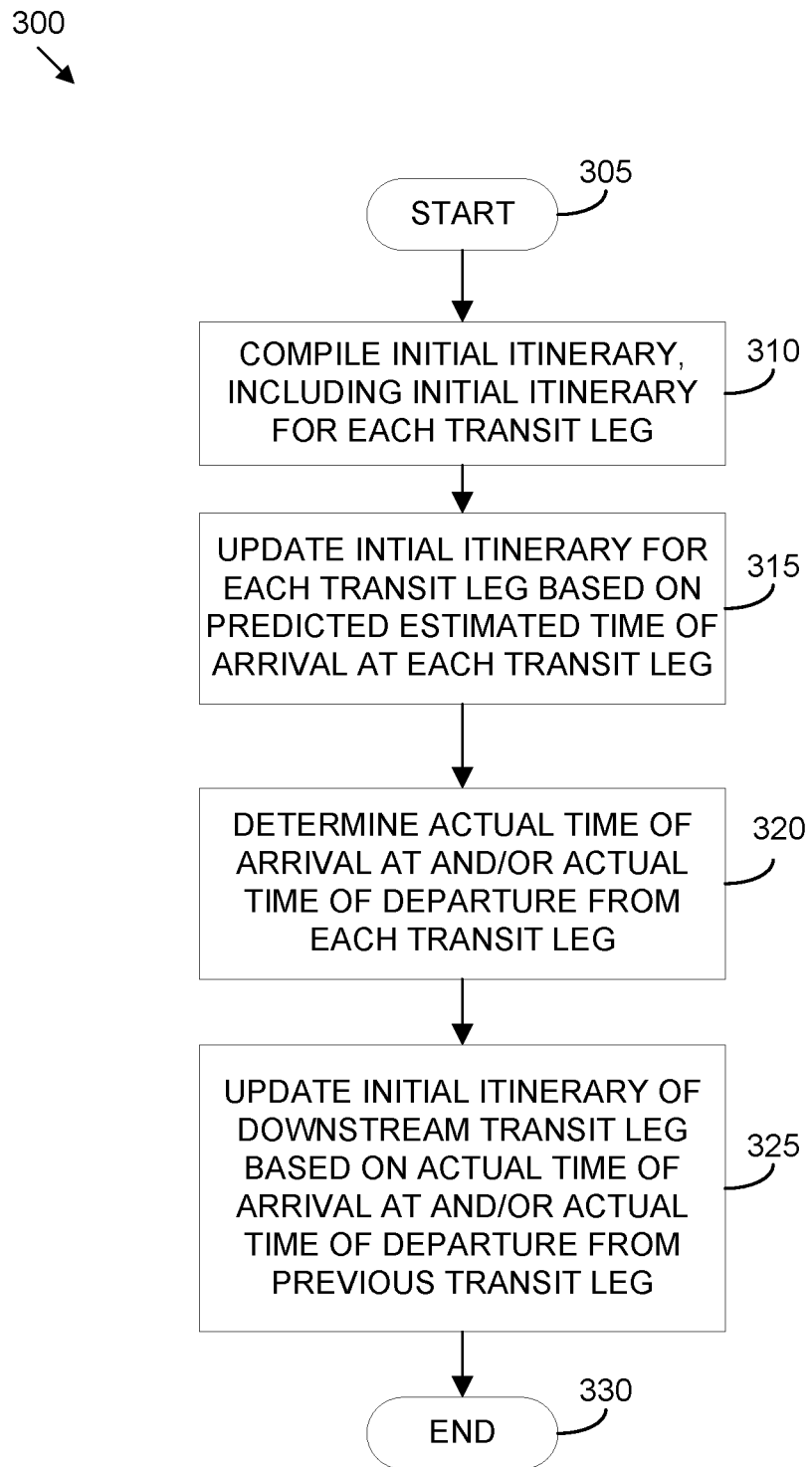
FIG. 3 is an example flowchart outlining operations of a process for determining an overall estimated time of arrival at a destination, in accordance with some embodiments of the present disclosure.

Turning now to FIG. 3, a flowchart outlining operations of a process 300 is shown, in accordance with some embodiments of the present disclosure. The process 300 may be implemented by the estimated time of arrival engine 205 of the estimated time of arrival application 200. The process 300 may be used to determine/predict an overall estimated time of arrival of a vehicle at a destination site. In some embodiments, the route from an initial source site to a final destination site may include one or more stops. At each stop, the vehicle may spend an amount of time, referred to herein as dwell time. The dwell time may impact the estimated time of arrival at the next stop and ultimately impact the estimated time of arrival at the final destination. Further, truck drivers may be required to abide by hours of service and break time regulations, which may be mandated by federal regulations and/or imposed by the truck driver's employer. Those hours of service and break times may further impact the estimated time of arrival at a particular stop and also impact the estimated time of arrival at the final destination. Thus, the process 300 is configured to consider not only the distance and road conditions (e.g., traffic conditions, weather conditions that might impact road travel, etc.) between the initial source site and the final destination site, the process 300 is also configured to consider driver workflow information, as well as dwell times in accurately predicting estimated times of arrival at each stop. Further, based upon actual time of arrival at a particular stop, the process 300 is configured to update the estimated time of arrival during the remaining part of the trip to the final destination. The updates may happen in real-time or substantially real-time.

Thus, the process 300 starts at operation 305 with the truck driver/vehicle starting from a source site to a final destination site. At operation 310, the estimated time of arrival engine 205 creates an itinerary for the truck driver/vehicle between the source site and the final destination site. The itinerary may include the driving route that the vehicle is to take from the source site to the final destination site based on driver preference. For example, in some embodiments, the driving route may be based on a shortest distance between the source site and the final destination site based on driver preference. In other embodiments, the driving route may be based on a fastest distance between the source site to the final destination site based on the driver preference. Further, in some embodiments, the driving route to the final destination site may include one or more stops or transit legs. In such cases, the itinerary may include the driving route to the final destination via the one or more stops or transit legs.

In some embodiments, the estimated time of arrival engine 205 may compile the itinerary based on information received from the data sources 210A-210N. For example, in some embodiments, the estimated time of arrival engine 205 may receive coordinates for the start and end of each transit leg, and call a first mapping or distance estimation database, such as Google's advanced distance matrix API, to receive travel distance and time to cover that distance in each transit leg. In some embodiments, the results obtained from the first mapping or distance estimation database may include current traffic data, weather patterns data, and other types of data that may impact travel. In some embodiments, if a particular transit leg is greater than a designated number of miles (e.g., greater than 100 miles) or requires greater than a designated number of hours to cover, the estimated time of arrival engine 205 may combine the results received from the first mapping or distance estimation database with other data received from other third party vendors/services.

For example, in some embodiments, if the distance/time of a transit leg is greater than a predetermined distance/time, the estimated time of arrival engine 205 may also call HERE transit API or API from another third party vendor/service to receive distance and time data therefrom via a second mapping or distance estimation database. The estimated time of arrival engine 205 may average the data received from the first mapping or distance estimation database and the data received from the second mapping or distance estimation database to improve the accuracy of the distance/time of the transit leg. In some embodiments, the estimated time of arrival engine 205 may receive distance/time data from yet another third party vendor/service to further improve the accuracy. In some embodiments, if a transit leg is less than a predetermined distance (e.g., less than 5 miles) or requires less than a predetermined amount of time, then the estimated time of arrival engine 205 may decide not to call the first or the second mapping or distance estimation databases. In some embodiments, the estimated time of arrival engine 205 may be configured to assign a default distance/time to each transit leg, and call the first and/or second mapping or distance estimation databases only if the distance/time is greater than the default values.

In some embodiments, if both the first and second mapping or distance estimation databases return miles remaining, and the difference between them is greater than a threshold distance (e.g., 50 miles), the estimated time of arrival engine 205 may exclude the data received from the second mapping or distance estimation databases and instead compile the itinerary based on the data received from the first mapping or distance estimation database. If only the second mapping or distance estimation database shows greater than 0 miles in the transit leg, while the first mapping or distance estimation database returns 0 miles in the transit leg, the estimated time of arrival engine 205 may use the data from the second mapping or distance estimation database and divide that data by a designated speed (e.g., 50 miles per hour) to determine the itinerary. In some embodiments, if the difference between the number of miles returned by the first and second mapping or distance estimation databases is less than 100 miles, the estimated time of arrival engine 205 may be configured to use data from the first mapping or distance estimation database by default. In other embodiments, the estimated time of arrival engine 205 may be configured to use the data provided by the second mapping or distance estimation database by default if the difference is less than 100 miles. Although the first and second mapping or distance estimation databases are used as examples of third party vendors/services, it is to be understood that in other embodiments, other or additional third party vendors/services may be used.

Thus, in some embodiments, the estimated time of arrival engine 205 may use transit data from one or more third party vendors/services to compute the overall initial itinerary from the source site to the final destination site, as well as the initial itinerary for each transit leg. By using data from multiple vendors to determine the overall initial itinerary and the initial itinerary for each transit leg, redundancy may be leveraged to ensure that valid data is returned for expected travel time. Furthermore, leveraging a multi-vendor approach may allow the estimated time of arrival engine 205 to confirm that the results returned by those vendors are reasonable. In some embodiments, one vendor may provide consideration of real time traffic data, weather pattern data, and social impacts of traffic into transit, and another vendor may provide consideration of vehicle speed governing and CMV routing. Additional vendor services may be used by the estimated time of arrival engine 205 as a redundancy and rationality check for the other vendors as necessary.

Thus, in some embodiments, the estimated time of arrival engine 205 may determine the transit distance/time in each transit leg, and the combination of the distance/time in each of the transit legs between the source site to the final destination site may provide an initial itinerary. The overall journey from the source site to the final destination site is referred to herein as a "trip." In some embodiments, the estimated time of arrival engine 205 may assign each transit leg a serial number or transit number to identify the order in which each of the transit legs are to be traversed. The estimated time of arrival engine 205 may receive real-time, or near real-time, updates (e.g., of a current amount of traffic on a particular transit leg, the weather along a particular transit leg, vehicle speed, etc.) to update the initial itinerary in real-time or substantial real-time. In some embodiments, the initial itinerary may store the following information for each transit leg: driver number of the driver assigned to the trip, serial number of the transit leg, current coordinates of the vehicle, the start coordinates of the transit leg (e.g., the previous stop or the transit leg source), a description of the start location of the transit leg, the end coordinates of the transit leg (e.g., the transit leg destination), a description of the end of the transit leg, and stop activity at the transit leg destination. In other embodiments, the estimated time of arrival engine 205 may store other or additional information about each transit leg in the initial itinerary. Stop activity may indicate, for example, the actual (and/or predicted time) at which the transit leg destination is reached (or to be reached), the dwell time (e.g., the amount of time the vehicle spends at the transit leg destination), whether freight is being dropped at the transit leg destination, whether freight is being picked up at the transit leg destination, what freight is being picked up/dropped off, and/or any other information that may be considered useful or desirable to have in the itinerary. In some embodiments, some of the information may be unknown at the start of a trip. For example, certain information (e.g., actual time of arrival, departure, etc.) about the stop activity may be unknown until the vehicle actually receives the transit leg destination. In such cases, the initial itinerary may have predicted values of the stop activity or those fields may be left blank.

Thus, the estimated time of arrival engine 205 compiles an initial itinerary at the operation 310 based on transit data received from one or more third party vendors, the transit legs during the trip, and the distance/time data on each transit leg. In some embodiments, the estimated time of arrival engine 205 may also leverage previously stored information related to a similar trip or transit leg or final destination site to compile the initial itinerary. For example, from previous data, the estimated time of arrival engine 205 may ensure that a later pickup of freight is not scheduled before a previous freight load is dropped off. In various embodiments, the estimated time of arrival engine 205 may store the initial itinerary in the memory 220. The estimated time of arrival engine 205 may also transmit the initial itinerary data to one or more output devices 120 and/or the memory device 110.

At operation 315, the estimated time of arrival engine 205 may update the initial itinerary compiled at the operation 310. In some embodiments, the estimated time of arrival engine 205 may update the initial itinerary in real-time or substantial real-time as the vehicle is travelling/moving. In other embodiments, the estimated time of arrival engine 205 may update the initial itinerary periodically. To update the initial itinerary, the estimated time of arrival engine 205 may determine a predicted estimated time of arrival at a transit leg destination. The process for predicting the estimated time of arrival at a transit leg destination is described in FIG. 4 below. The predicted estimated time of arrival may consider driver workflow information (e.g., hours of service, break time, etc.), which may or may not be considered when creating the initial itinerary at the operation 310.

In addition to the predicted estimated time of arrival of the operation 315, the estimated time of arrival engine 205 may consider actual time of arrival/departure in each transit leg to update the initial itinerary at operations 320 and 325. For example, as the driver is traversing each transit leg, the estimated time of arrival engine 205 may receive indications (e.g., manually entered by the driver and/or other personnel or automatically received from systems upon satisfying certain conditions etc.) indicating whether the vehicle reached a particular transit leg destination. For example, in some embodiments, upon reaching a transit leg destination, the estimated time of arrival engine 205 may receive an indication that the vehicle has reached a transit leg destination. The estimated time of arrival engine 205 may record the actual time of arrival at the transit leg destination and update the itinerary for the next transit leg based on the actual time of arrival. In some embodiments, the estimated time of arrival engine 205 may also get an indication when the vehicle departs the transit leg destination for another transit leg. In some embodiments, the estimated time of arrival engine 205 may determine the actual arrival and/or departure time at a transit leg destination based upon receiving an update of completed arrival from an input device 115, such as a user device of the driver or a fleet tracking system that monitors coordinates of the various vehicles making deliveries. The estimated time of arrival engine 205 may also use this information to update the itinerary for the next transit leg.

Further, in some embodiments, the estimated time of arrival engine 205 may be configured to make certain assumptions when updating the initial itinerary at the operations 320 and 325. In some embodiments, the estimated time of arrival engine 205 may search for a most recent completed work assignment within a driver's updated assignments to skip over prior incomplete work assigned to the driver. For example, in some embodiments, the estimated time of arrival engine 205 may not receive indication of the actual time of arrival/departure from the transit leg destination. This may be because the driver (or other personnel) forgot to enter that information or because certain conditions were not satisfied that would have caused the indications to go out. In such cases, the estimated time of arrival engine 205 may resolve gaps in a trip's continuity by skipping over un-actualized arrivals and departures (e.g., when the actual time of arrival/departure is not received) based on more recent information available. For example, if the estimated time of arrival engine 205 does not receive an indication of actual departure from a previous transit leg destination but receives an actual arrival or departure indication from the next transit leg destination, the estimated time of arrival engine 205 may assume that the vehicle completed the previous transit leg and updates the downstream itinerary based upon the received indications. Two, non-limiting, examples of such assumptions may include: if a shipment has actuals registered after the "current" shipment, the itinerary may jump the driver to the latest shipment that has an actual arrival; if the current shipment has an actual on a future stop, itinerary may assume previous un-actualized stops are also complete.

Thus, after determining a most recently completed work assignment, the estimated time of arrival engine 205 may remove any work prior to most recently completed work forward. Beneficially, the estimated time of arrival engine 205 may process work assignments to understand that a stop is complete, or that a driver has departed a stop already, based on a work assignment that was scheduled "later" being completed. For example, if poor reception causes a missed indication of a completed stop update or a pay process causes a completion of a stop arrival or departure to not update, the estimated time of arrival engine 205 may still determine that the stop was completed by detecting completion of work further along on the overall transit route. In some embodiments, the estimated time of arrival engine 205 saves these changes in arrival or departure updates at stops as "soft actuals." A "soft actual," as referred to herein, is an update to a completed work assignment that is caused by an actual update of completion of a work assignment that occurs at a later point on a compiled itinerary, for example. As such, the estimated time of arrival engine 205 may monitor truck polling and documentation of arrival or departure at an expected, next stop of the driver to determine soft actual updates of previous stops.

In some embodiments, the estimated time of arrival engine 205 may be configured to update the predicted estimated time of arrival at a next stop based on the actual time of arrival or departure at one or more previous stops. For example, if the actual time of arrival or departure from transit leg A is determined to be 15:30, the estimated time of arrival engine 205 may update the initial itinerary from the transit leg A to the transit leg B based upon the actual time of arrival or departure at/from transit leg A. In some embodiments, the estimated time of arrival engine 205 may be configured to update the initial itinerary of each subsequent stop on the delivery route based on a change in actual time of arrival/departure at a previous stop. As such, the estimated time of arrival engine 205 may prevent propagating errors downstream. Advantageously, this may help prevent drivers from missing scheduled appointments at a stop. In addition, based on the updated predicted transit estimated time of arrival of the following stops, the estimated time of arrival engine 205 may be able to determine whether a scheduled appointment with a customer needs to be rescheduled. For example, if the updated predicted transit estimated time of arrival of a final stop on the delivery route occurs after the end of an appointment, using the estimated time of arrival application 200 may allow customers to be notified further in advance that a drop off of a delivery is getting pushed back. In some embodiments, when the process 300 ends at operation 330, the estimated time of arrival engine 205 stores the updated itinerary in a table of the memory 220 and/or transmits the updated itinerary to the output devices 120.

Thus, the process 300 determines an overall initial itinerary based upon distances/times and road conditions of each transit leg on the trip, and updates the initial itinerary of one or more downstream transit legs based on predicted estimated time of arrival at one or more previous transit legs and actual time of arrival at or actual time of departure from one or more previous transit legs. The estimated time of arrival engine 205 may continue to monitor and adjust the initial itinerary for each transit leg based upon changing road conditions, as discussed above.

Figure 4:
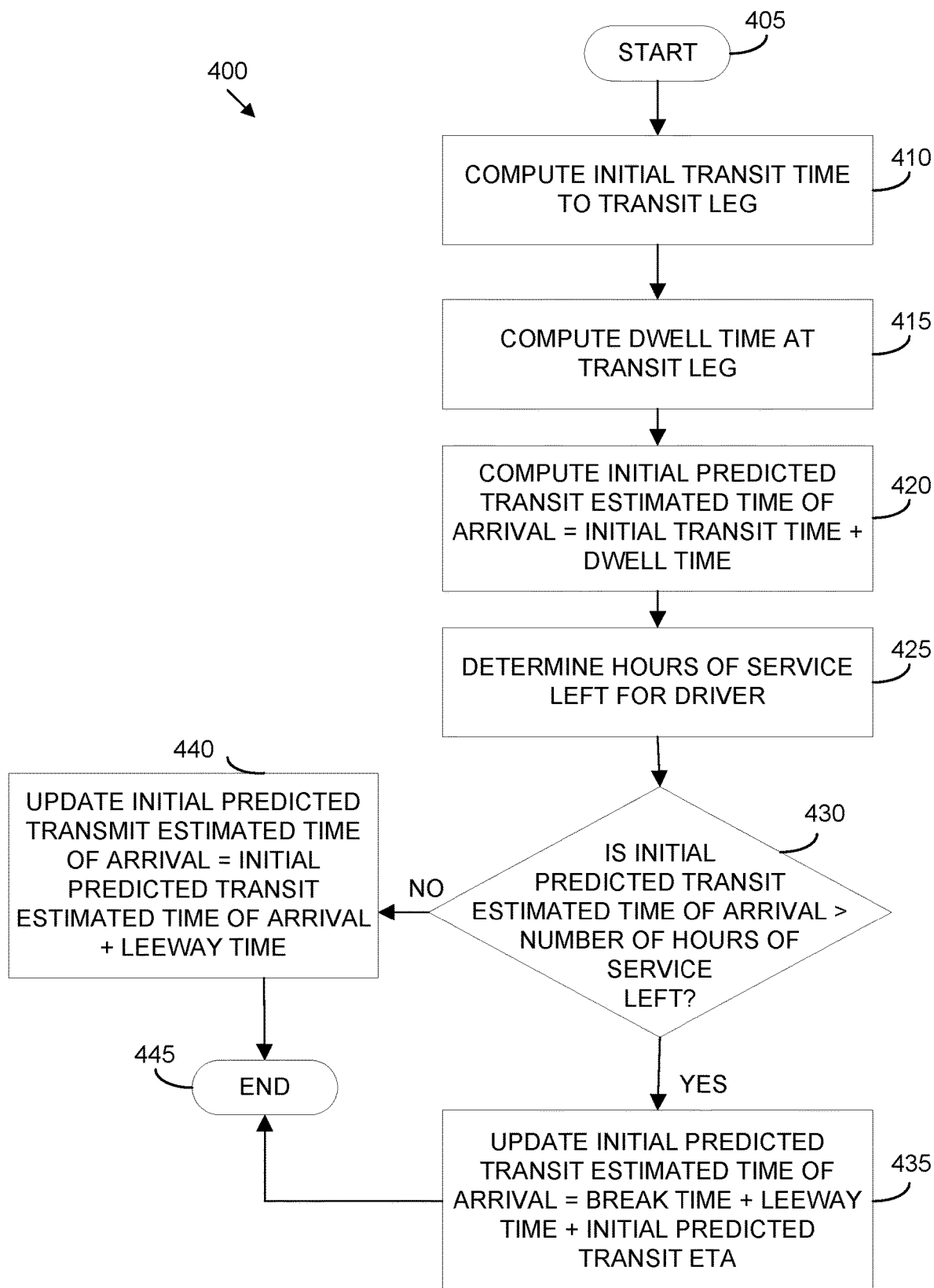
FIG. 4 is an example flowchart outlining operations of a process for determining a predicted estimated time of arrival at a stop on the way to the destination of FIG. 3, in accordance with some embodiments of the present disclosure.

Referring now to FIG. 4, a flowchart outlining operations of a process 400 is shown, in accordance with some embodiments of the present disclosure. The process 400 may be implemented by the estimated time of arrival engine 205 of the estimated time of arrival application 200. The process 400 describes the operation 315 in greater detail. Thus, the process 400 may be used to compute a predicted estimated time of arrival at a transit leg. In some embodiments, the process 400 begins at operation 405 in response to receiving the initial itinerary for a particular transit leg from the operation 310. The process 400 then considers driver workflow to update the initial itinerary.

At operation 410, the estimated time of arrival engine 205 computes an initial transit time for the transit leg. For example, the estimated time of arrival engine 205 may calculate the expected amount of time to complete a transit leg (e.g., from a previous transit leg destination to a current transit leg destination), as discussed above using third party services and other historical data from a similar driving route. In some embodiments, the operation 410 may be performed as part of the operation 305, in which case the operation 410 may be skipped. In some embodiments, the estimated time of arrival engine 205 may receive a change in current traffic data, weather patterns data, or other road conditions related data that may impact the current driving route for the driver from the third party vendor services, as discussed above. In response to receiving such data, the estimated time of arrival engine 205 may update the initial itinerary of the transit leg.

At operation 415, the estimated time of arrival engine 205 computes a dwell time at the transit leg. As indicated above, dwell time is the amount of time that a driver/vehicle spends at a particular transit leg destination. The estimated time of arrival engine 205 may determine the dwell time at a particular transit leg destination based upon a difference between an actual departure time from the transit leg destination and an actual time of arrival at the transit leg destination. In some embodiments, the estimated time of arrival engine 205 may predict the dwell time at the transit leg destination based on a calculation of historical dwell time data for that particular transit leg destination or other similar transit leg destination(s). In some embodiments, the historical dwell time data may be specific to one or more drivers (e.g., a particular driver may take longer than another driver at the same transit leg destination) and/or may be specific to a particular transit leg destination. The estimated time of arrival engine 205 may store the historical dwell time data in the memory 220.

In some embodiments, each entry of dwell time data stored in the memory 220 may include a period parameter. The period parameter may include a "very recent history" value, a "recent history" value, and/or a "history" value. The "very recent history" value may be associated with any dwell time data that occurred within the past 12 hours. The "recent history" value may be associated with any dwell time data that occurred within the past 12 to 24 hours. Dwell time data that occurred within the past 90 days may be associated with a period parameter of "history." In some embodiments, the estimated time of arrival engine 205 may store at least 10 entries of dwell time data with the period parameter of "history," at least 2 entries of dwell time data with the period parameter of "recent history," and at least 2 entries of dwell time data with the period parameter of "very recent history." In other embodiments, the estimated time of arrival engine 205 may store other number of entries for each of the period parameters.

As new, actual dwell time data is received, the estimated time of arrival engine 205 may rewrite outdated historical dwell time data. For example, as more recent actual dwell time data is received, the estimated time of arrival engine 205 may save the new entries of dwell time data in the memory 220 as "very recent history" and may rewrite dwell time data of "recent history" that is now more outdated. These actual dwell time data values may be used to attempt to identify realistic activity times for a driver stopping at a stop on the delivery route. Greater dwell time may be a result of having to unload a large amount of freight from a truck at a stop. In some embodiments, certain types of activities may be assigned default dwell times, which may be updated as actual dwell time data becomes available. For example, in some embodiments, an activity of a border crossing may be assigned a one-hour dwell time by default by the estimated time of arrival engine 205. To that end, a "transit leg" need not only include destinations where the driver is dropping off freight or picking up freight. Rather, in some embodiments, a "transit leg" may be any designated (or possibly unplanned) stop that the driver may need to make on the way to the final destination.

In some embodiments, the estimated time of arrival engine 205 may be configured to use a minimum of 15-minute dwell time if a predicted or actual dwell time is determined to be less than 15 minutes of activity time. For example, if the order management system lists less than 15 minutes for activity time at a particular stop on the delivery route, the estimated time of arrival engine 205 uses a minimum of 15 minutes for that dwell time. In some embodiments, if the estimated time of arrival engine 205 is unable to determine a historical trend for dwell time at a stop, the order management system data can be utilized for the dwell time based on LoS and activity.

Once the historical trends and order management system data are identified, a secondary process generates a dwell table that is then utilized by the estimated time of arrival engine 205. In some embodiments, the dwell table may be one of the data sources 210A-210N. In some embodiments, the secondary process may be conducted by the processor 215 of the estimated time of arrival engine 205, where as in other embodiments the estimated time of arrival engine 205 receives the dwell table (e.g., from a cloud-based network). The calculated dwell table can include weighted averages that indicate expected dwell times for a current day, the next day, and the following days for each leg of service (e.g., transit leg) and activity at each stop on the delivery route. For example, the logic for this weighted concept to leverage different historical data may include:

TODAYS_DATE=0.5*"very recent history" dwell time data+0.25*"recent history" dwell time data+0.25*"history" dwell time data;

NEXT_DAY=0.3*"very recent history" dwell time data+0.4*"recent history" dwell time data+0.4*"history" dwell time data;

FOLLOWING_DAYS=1*"history" dwell time data;

As such, for a current date, "history" historical dwell time data may be weighted 25% in determining trends, "recent history" historical dwell time data may be weighted 25%, and "very recent history" historical dwell time data may be weighted 50%. It is to be understood that the values of the weighted averages are shown only as an example, and are not meant to be limiting in any regard. In other embodiments, other weight values may be used.

In other embodiments, the estimated time of arrival engine 205 may be configured to estimate trends of dwell time at different periods of the day. For example, the estimated time of arrival engine 205 may determine a trend of dwell time based on historical data for early morning, late morning, early afternoon, evening, overnight, and the like. As another example, the estimated time of arrival engine 205 may identify trends of dwell time for different days of the week at each stop. In some embodiments, the estimated time of arrival engine 205 may also be configured to identify dwell time trends based on a type of commodity that is being delivered by the driver and/or the specific driver. As such, the estimated time of arrival engine 205 may be able to determine whether an individual driver tends to spend a longer amount of time at a stop (e.g., a drop-off site) than an average driver in the fleet of deliveries. For example, it may be possible to determine that a specific driver usually spends 45 minutes at a site, whereas an average for the fleet of drivers is approximately 25 minutes of dwell time. Determining this variance from an average driver in a fleet may be beneficial when estimating a dwell time that occurs at a particular stop on a delivery route.

In some embodiments, the calculated, weighted averages above may be determined every 15 to 20 minutes. Thus, the dwell table may be updated every 15 to 20 minutes to indicate the most recent predicted dwell times for a delivery route. By improving estimations of dwell time at stops of the delivery route, the estimated time of arrival application 200 may beneficially improve accuracy of downstream, predicted estimated time of arrival at a particular transit leg.

Still referring to FIG. 4, the estimated time of arrival engine 205 computes an initial predicted transit estimated time of arrival at the transit leg at operation 420. The initial predicted transit estimated time of arrival may be computed by combining (e.g., adding) the initial transit time of the operation 410 and the dwell time predicted at the operation 415. The initial predicted transit estimated time of arrival may represent the amount of time it takes to depart from one stop, reach the subsequent stop, and complete an activity at the stop (e.g., a delivery, unloading freight from a vehicle, and so on) before departure. In some embodiments, the initial predicted transit estimated time of arrival may be continuously recomputed by the estimated time of arrival engine 205 after a predetermined period occurs. For example, the estimated time of arrival engine 205 may repeat the operations 410, 415, and 420 every 15 minutes, 30 minutes, hour, etc. In some embodiments, the occurrence with which the estimated time of arrival engine 205 recalculates the initial predicted transit estimated time of arrival to a stop is based on an expected duration of an overall trip and/or an expected duration of a leg (e.g., from one stop to the next stop, such as from site A to site B) of the overall delivery route.

At operation 425, the estimated time of arrival engine 205 determines hours of service ("HoS") left for a driver. In some embodiments, the estimated time of arrival engine 205 determines the amount of remaining HoS of the driver by subtracting a current number of hours worked by the driver in a current shift from a legal/imposed limit for the maximum number of hours a driver can work in a given shift, before requiring a break. For example, a maximum amount of DoT mandated HoS in each shift may be 11 hours, and if the estimated time of arrival engine 205 subtracts 9 hours of time worked for a driver in a particular shift, the remaining HoS for the driver is calculated as 2 hours. In other embodiments, the estimated time of arrival engine 205 may receive a value of remaining time on a timer that counts down from the maximum amount of allowed HoS for a driver as the driver works on the delivery route.

In some embodiments, the estimated time of arrival engine 205 determines whether time remaining until the initial predicted transit estimated time of arrival is greater than the number of HoS left for the driver at the operation 430. For example, the estimated time of arrival engine 205 may compare the amount of time left to reach the transit leg (e.g., obtained by subtracting the current time from the initial predicted transit estimated time of arrival) with the number of HoS left. In response to determining that the amount of time needed to reach the transit leg destination is greater than the number of HoS left, the process 400 proceeds to operation 435. At the operation 435, the estimated time of arrival engine 205 computes an updated predicted transit estimated time of arrival value by combining (e.g., adding) a break time, a leeway time, and the initial predicted transit estimated time of arrival. Break time may be a federally mandated or employer imposed time-off that a driver needs to take after each shift. In other words, after working for the number of hours defined in the HoS, the driver may be required to take a designated number of hours off before resuming driving.

On the other hand, if at the operation 430, the estimated time of arrival engine 205 determines that the amount of time needed to reach the transit leg destination is less than the number of HoS left for the driver, the process 400 proceeds to operation 440. At the operation 440, the estimated time of arrival engine 205 computes an updated predicted transit estimated time of arrival by combining (e.g., adding) the initial predicted transit estimated time of arrival and a leeway time. The leeway time may be a variance between a break time that extends beyond 10 hours, where the leeway time is equivalent to the difference between the length of the break time typically taken by the driver and 10 hours. For example, if a driver prefers to take a 12 hour break and the required break time is 10 hours, the leeway time may be 2 hours.

At operation 445, the estimated time of arrival engine 205 is configured to end the process 400. In various arrangements, at the end of the process 400, the estimated time of arrival engine 205 transmits the updated predicted transit estimated time of arrival to one or more of the output devices 120 and/or the memory device 110. For example, the estimated time of arrival engine 205 may transmit a notification to a fleet manager of several drivers that an updated predicted transit estimated time of arrival has been calculated and/or that the new predicted transit estimated time of arrival occurs on a different day than the previous value of the predicted transit estimated time of arrival. In another example, the estimated time of arrival engine 205 is configured to determine whether the updated predicted transit estimated time of arrival occurs after an appointment for delivery on the route. As such, the estimated time of arrival engine 205 may generate a notification to transmit to the output devices 120 if the driver is now expected to be late for a scheduled appointment time with a client. In some embodiments, the estimated time of arrival engine 205 is configured to store the updated predicted transit estimated time of arrival value in the memory 220.

Figure 5:
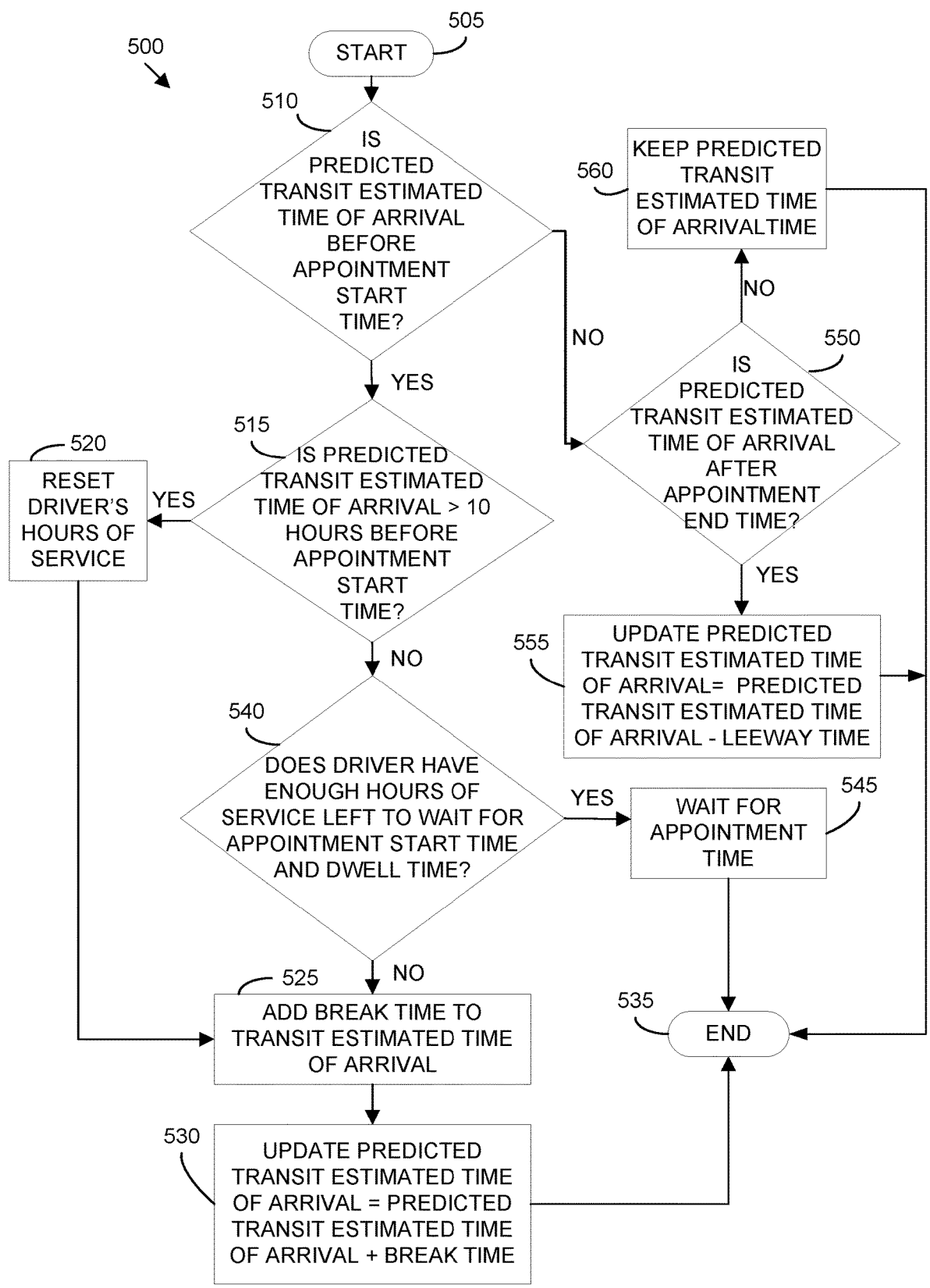
FIG. 5 is an example flowchart outlining operations of a process for updating the predicted estimated time of arrival of FIG. 4 based on an appointment time at the stop, in accordance with some embodiments of the present disclosure.

Turning now to FIG. 5, a flowchart outlining operations of a process 500 is shown, in accordance with some embodiments of the present disclosure. The process 500 may be implemented by the estimated time of arrival engine 205 of the estimated time of arrival application 200. The process 500 may be used to further update the updated predicted transit estimated time of arrival computed in FIG. 4. Thus, the process 500 begins at operation 505 with the updated predicted transit estimated time of arrival of FIG. 4. In some embodiments, the process 500 may be implemented as part of the operations 430, 435, and 440. Thus, although the process 500 is described below considering the updated predicted transit estimated time of arrival, in some embodiments, the process below may additionally or instead be implemented considering the predicted transit estimated time of arrival.

At operation 510, the estimated time of arrival engine 205 determines whether the updated predicted transit estimated time of arrival of FIG. 4 is before an appointment start time at the transit leg destination. For example, the estimated time of arrival engine 205 may receive from one of the data sources 210A-210N an appointment start time and an appointment end time for each transit leg. Thus, for a particular transit leg, the estimated time of arrival engine 205 may compare the updated predicted transit estimated time of arrival for that transit leg with the appointment start time at that transit leg. In response to determining that the updated predicted transit estimated time of arrival is before the appointment start time, the process 500 continues to operation 515.

At the operation 515, the estimated time of arrival engine 205 determines whether the updated predicted transit estimated time of arrival is greater than 10 hours before the appointment start time. For example, the estimated time of arrival engine 205 calculates the difference in hours between the updated predicted transit estimated time of arrival and the scheduled appointment start time. If the estimated time of arrival engine 205 determines that the difference is greater than 10 hours, indicating that the updated predicted transit estimated time of arrival is at least 10 hours earlier than the appointment start time, the process 500 continues to operation 520.

At the operation 520, the estimated time of arrival engine 205 resets the HoS for the driver. In some embodiments, the estimated time of arrival engine 205 transmits a notification to the output devices 120 (e.g., a mobile device of the driver) that the HoS have been reset. Resetting the HoS of the driver may include restarting a timer that counts down from the designated number of HOS hours (e.g., 11 hours), for example. In various arrangements, at the operation 520, a HoS timer may be reset to a value of 14 hours. In additional embodiments, at the operation 520, instead of a HoS timer that counts down from an initial value of 11 hours or 14 hours, for example, the HoS timer may be reset to an initial value of 0 hours and increased for each hour the driver is on duty and/or driving.

Next, the process 500 proceeds to operation 525 where the estimated time of arrival engine 205 adds a break time to the updated predicted transit estimated time of arrival. In some embodiments, at the operation 525, the estimated time of arrival engine 205 may add a break time of 10 hours to the updated predicted transit estimated time of arrival. In other embodiments, the estimated time of arrival engine 205 may add a break time of other number of hours, including leeway time, to the updated predicted transit estimated time of arrival. In some embodiments, the estimated time of arrival engine 205 may receive a break time parameter from the input devices 115 that is an average, historical amount of break time taken by drivers on a similar route.

On the other hand, if at the operation 515, the estimated time of arrival engine 205 determines that the updated predicted transit estimated time of arrival is less than 10 hours earlier than the appointment start time, the process 500 may continue to operation 540. At the operation 540, the estimated time of arrival engine 205 determines whether the driver has enough HoS left to wait for the appointment start time and dwell time. In some embodiments, the estimated time of arrival engine 205 determines if the drive has enough HoS remaining to complete the appointment by calculating the difference in time between the updated predicted transit estimated time of arrival and the appointment start time, and then adding to the difference the amount of expected dwell time. The estimated time of arrival engine 205 may then subtract the result from a remaining HoS parameter for the driver. If the result is a negative value, the estimated time of arrival engine 205 determines that the driver does not have enough remaining HoS to wait for the appointment start time and dwell time. For example, if the updated predicted transit estimated time of arrival is 11:00 and the appointment start time is 14:00, the estimated time of arrival engine 205 calculates a difference of 3 hours. Next, the estimated time of arrival engine 205 may add an expected dwell time of, say, 0.5 hours to the 3 hours for a total of 3.5 hours. If the drive has at least 3.5 HoS left, the estimated time of arrival engine 205 then determines that the driver can complete the appointment. However, if the driver has less than 3.5 hours remaining for HoS, then the estimated time of arrival engine 205 determines the driver does not have sufficient HoS left to complete the appointment.

In response to determining the driver has enough HoS remaining to wait, the method continues to operation 545. At the operation 545, the updated predicted transit estimated time of arrival may remain unchanged and the driver waits for the appointment start time. In some embodiments, the estimated time of arrival engine 205 is configured to transmit an alert to the output devices 120 to notify a user that the driver should continue to wait for the appointment start time. After the operation 545, the process 500 ends at operation 535. However, if at the operation 540, the estimated time of arrival engine 205 determines that the driver does not have sufficient hours left from a HoS parameter for the driver, the process 500 instead continues to the operation 525 and the estimated time of arrival engine 205 may be configured to add a break time (and/or leeway time) to the updated predicted transit estimated time of arrival.

From the operation 525, the process 500 proceeds to operation 530. In some embodiments, the estimated time of arrival engine 205 is configured to calculate a second updated predicted transit estimated time of arrival at the operation 530. The estimated time of arrival engine 205 may calculate the second updated predicted transit estimated time of arrival by adding the break time to the updated predicted transit estimated time of arrival. The estimated time of arrival engine 205 may also be configured to output to the user interface 225, via the API 230, the second updated predicted transit estimated time of arrival. Furthermore, the estimated time of arrival engine 205 may be configured to send the second updated predicted transit estimated time of arrival value to the memory device 110 to store the value for analyzing historical data of transit estimated time of arrival.

Returning to the operation 510, if the estimated time of arrival engine 205 determines that the updated predicted transit estimated time of arrival is not before the appointment start time, the process 500 proceeds to operation 550.

At the operation 550, the estimated time of arrival engine 205 is configured to determine whether the updated predicted transit estimated time of arrival is after an appointment end time. As such, the estimated time of arrival engine 205 may determine whether the driver is expected to arrive during the appointment time, or if the driver is running too late and will miss the appointment entirely. For example, the estimated time of arrival engine 205 may receive from the data sources 210A-210N, information stored in the memory device 110, that an appointment is scheduled to end at 15:00. The estimated time of arrival engine 205 may be configured to then subtract the scheduled end time of the appointment from the updated predicted transit estimated time of arrival. If the result is greater than 0 hours, then the estimated time of arrival engine 205 determines that the updated predicted transit estimated time of arrival is after the appointment end time, indicating the driver is running off schedule. In response to determining that the updated predicted transit estimated time of arrival is after the end time of a scheduled appointment, the estimated time of arrival engine 205 may then update the updated predicted transit estimated time of arrival at operation 555.

In some embodiments, at the operation 555, the estimated time of arrival engine 205 sets the second updated predicted transit estimated time of arrival equal to the difference of a leeway time from the current updated predicted transit estimated time of arrival. The leeway time may be an indication of break leeway for a driver and calculated by subtracting 10 hours from the amount of hours a driver was on break. For example, every time a break extends beyond 10 hours, the estimated time of arrival engine 205 calculates the leeway time and transmits an indication of the leeway time to the memory device 110 and/or saves the data on the leeway time in the memory 220. In other embodiments, the leeway time may be calculated in other suitable ways. The estimated time of arrival application 200 system may assume a 12 hour break unless a driver is expected to be late for an appointment, in some embodiments. By executing the steps of the process 500, the estimated time of arrival application 200 may be able to restructure previous break assumptions if a driver is expected to arrive to an appointment late. Therefore, the process 500 and the estimated time of arrival application 200 may improve facilitating a delivery time closer to the expected appointment time or making an on time delivery to a client at the scheduled appointment.

However, if at the operation 550, the updated predicted transit estimated time of arrival is determined by the estimated time of arrival engine 205 to not be after the appointment end time, the estimated time of arrival engine 205 may be configured to leave the updated predicted transit estimated time of arrival unchanged. As such, the estimated time of arrival engine 205 may be configured to keep the updated predicted transit estimated time of arrival time constant when the driver is expected to be on time with the delivery at some point during an appointment time. After execution of the operation 555 or 560, the process 500 ends at the operation 535. In some arrangements, at the operation 535, the estimated time of arrival engine 205 may be configured to store the second updated predicted transit estimated time of arrival in the memory 220. In other arrangements, the estimated time of arrival engine 205 may be configured to transmit a notification of the second updated predicted transit estimated time of arrival to the user interface 225 or relay the information via a network to the output devices 120.

Thus, the estimated time of arrival application 200 provides the ability to calculate an accurate real-time or substantial real-time estimated time of arrival considering not just distance and road conditions, but also considering dwell time, hours of service, driver workflow, and other types of information. The estimated time of arrival application 200 may also monitor truck polling and make assumptions on completed work in an absence of actual updates on arrival/ departure times of a driver to/from a stop. The capability to form assumptions on completed work of earlier work assignments, in response to polling arrival or departure at a later work assignment, is referred to as a "soft actual" logic capability of the estimated time of arrival application 200. In some embodiments, a driver departs with detention time and the TMS errors departure until approved and reprocessed by DBL for pay reasons. The estimated time of arrival application 200 may require confirmation that a departure is actually complete and may stop considering the assignment, despite the TMS showing the work (e.g., departure) is incomplete. The TMS may indicate incomplete work still pending for routing points, border crossings, tablet cell service, and driver neglect of workflow, while the estimated time of arrival application 135 utilizes "soft actual" logic to prevent downstream ETA/next available time (NAT) inaccuracy.

Additionally, the estimated time of arrival application 200 may recognize and leverage driver/operations overrides when received (e.g., from input devices 110) to effect current stop departure assumptions and downstream ETAs/NATs. Further, prior override data can be leveraged by the estimated time of arrival application 200 to ensure trips (i.e., delivery routes) stay aligned to driver/operations overrides. For example, if a NAT override is used and pre-assignments are made based on that NAT, the estimated time of arrival application 200 maintains the NAT date and time (DTTM) and HoS reported on the prior load to ensure new dispatch starts at time of override. Prior to utilizing this logic, once a new dispatch was made, previous NAT override was inaccessible. This often caused an assumption that a driver was available earlier than previous NAT override was set and pulled arrivals to preassigned date/times earlier than NAT override was set for. The estimated time of arrival application 200 may also evaluate RTW, out of service (OOS), and time at home (TAH) shipment as work (SAWs) differently than other stops on a delivery route. For example, the estimated time of arrival application 200 may not adjust any estimated time of arrivals for these types of SAWs or leverage the final updated NAT for SAW as a NAT override for next pre-assignment, regardless of NAT on SAW qualifying as an override.

In some embodiments, the estimated time of arrival application 200 utilizes dynamic and responsive dwell times. For example, the estimated time of arrival application 200 may leverage the past 90 days of historical arrival and departure times at stops on a delivery route. The last 12 and 24 hours for deliveries may be weighed more heavily to drive more accurate estimated dwell times at stops based on work completed in the past, as well as current or recent delays reported to the estimated time of arrival application 200. In various embodiments, the estimated time of arrival application 200 uses dwell times in determining a predicted earliest possible arrival time at a stop on a delivery route. The estimated time of arrival application 200 may also determine earliest possible arrival times based on a last stop departure and remaining HoS. Additionally, the estimated time of arrival application 200 may calculate and update predicted NATs for drivers. In some embodiments, the NATs are calculated and updated based on the predicted transit estimated time of arrival at a last stop for a driver on a route.

In some embodiments, the NATs are updated based on one or more predicted transit estimated time of arrivals throughout the driving route. The estimated time of arrival application 200 may utilize the estimated dwell times to improve predictions of NATs for drivers. Beneficially, the use of predicted NATs from the estimated time of arrival application can improve productivity through better dispatch of drivers and capacity planning calculations. For example, if predicted NATs indicate drivers will not be available until after several delivery routes need to be started, the NATs can indicate that not enough capacity is currently available to accomplish one or more planned trips/deliveries. As such, a user of the estimated time of arrival application 200 (e.g., a delivery company) may plan accordingly to account for the overcapacity or under capacity.

In some embodiments, the estimated time of arrival application 200 considers data parameters such as shipper ready date, shipper ready time, appointment start time, relay drop ETA, and a driver's work schedule when available. The estimated time of arrival application 200 may compute a delta to earliest allowed arrival time of a driver at a step on a delivery route. This delta can impact previous DoT break estimate lengths, can be shortened if a late arrival is estimated, of can be lengthened if a next stop appointment start time may cause poor utilization if the driver's break ended when originally estimated. In some embodiments, the estimated time of arrival application 200 generates several predicted transit ETAs that can be used to adjust available DoT HoS at time of adjusted arrival to ensure proper utilization for downstream ETA/NATs. The ETA/NATs may be updated to TMS on the 15 minute marks by the estimated time of arrival application 200, even though the application may determine estimates for the ETA/NATs to the second.

The estimated time of arrival application 200 may dynamically balance workload by running on several different engines dependent on the workload. For example, the itinerary identifies drivers with work assigned, and the estimated time of arrival application 200 sorts these drivers based on demographics, such as Line of Service, and works to evenly distribute current workload across a number of necessary engines. As such, the estimated time of arrival application 200 may improve an effort to continue to re-estimate ETAs and NATs at the desired 15 minute intervals. The estimated time of arrival application 200 may store all approved ETA/ETD/NAT updates to a table stored in memory (e.g., memory device 110). To prevent external workflow issues, the updates may be sent to the TMS no sooner than 15 seconds since the last update was pulled from the updated table and sent to the TMS. This may allow the TMS to process each update before receiving a downstream update too quickly, which may cause external workflow issues.

In various embodiments, the estimated time of arrival application 200 consumes driver calendar events "Work Extra Day." These driver calendar events may be updated by the dispatch system, to make drivers available for dispatch outside of the TMS work schedule. The estimated time of arrival application 200 may manipulate driver work schedules, by inputting appropriate date/time work schedules, to enable utilizing the driver during driver calendar events that fall outside the TMS work schedule.

The estimated time of arrival application 200 may track and store the last time that a HoS table displayed a current duty status of 3 or 4 hours (of driving or on duty) for a driver. This information can be leveraged by the estimated time of arrival application 200 to determine when driver's DoT break is expected to end. This may help prevent the beginning of a transit in the middle of a required break based on SNI safety policy that is not aligned to DoT legal requirements caused by a split break. Additionally, the ability to determine when a driver's DoT break is expected to may beneficially prevent an over 11 hour break estimate unexpectedly pulling a driver start forward 2 hours once a 10 hour break is complete. This may be caused by legal DoT time displaying legal hours, despite previous and current ETA/NATs being based on assumption of a longer break estimate.

In some embodiments, the estimated time of arrival application 200 creates leeway equal to the variance of 10 hours to a length of a break whenever a break extends beyond 10 hours. The estimated time of arrival application 200 may then remove this leeway in the case of a late service estimate. For example, if two 12 hour breaks were assumed, except a driver will now be 3 hours late, the estimated time of arrival application 200 may remove 3 hours of leeway time to still estimate and indicate on-time delivery at the stop. In some embodiments, if the estimated time of arrival application 200 determines that a driver is currently at a stop, based on an actual arrival update with no subsequent departure update, and no soft actual departure update has been triggered, the estimated time of arrival application may check an estimated dwell time at that stop. If it is determined that the current time is past the expected dwell time, the estimated time of arrival application 200 may monitor polling of the vehicle of the driver against stop coordinates. This can be used as a redundancy check against the "soft actual" logic. If it is determined that the driver is still tracking on site, the estimated time of arrival application 200 may determine if a DoT break seems likely. The estimated time of arrival application 200 instead may assume departure in 30 minutes based on the driver not yet tracking on the move from the stop, but having stayed at the stop past the expected dwell time. Similar logic may be applied at a start of a trip. If an estimated break length has ended and a driver has not started work, the estimated time of arrival application 200 may assume departure in the next 30 minutes.

Further, the estimated time of arrival application 200 may include none freight related (NFR) 1 continuity logic. A NFR event can be a stop on the transit for a truck driver, for example. The estimated time of arrival application 200 may ignore NFR 1 stops in relation to downstream estimated, but may send an updated estimated time of arrival to the NFR if the NFR is or may become of out order with other assigned stops on assigned shipment's. Advantageously, the estimated time of arrival application 200 may then clean up tangled workflow when ETAs are allowed to go out of an assigned sequence. In some embodiments, this logic of the estimated time of arrival application 200 also includes acknowledgment that previous NAT override or RTW/OOS/TAH NAT are still start date/time for a trip, even if pre-assignment NFR 1 is actualized due to a driver activating a next shipment before starting actual work on shipment. In other embodiments, the estimated time of arrival application 200 may not include NFR 1 logic, and may instead include other logic to organize driver workflow when ETAs are able to go out of an ordered, assigned sequence.

In various embodiments, the estimated time of arrival application 200 may designate particular drivers in a timeout, which stops the estimated time of arrival application 200 from making future updates by eliminating driver itinerary, until certain activities will automatically take the driver out of timeout. A dispatch system may utilize data from a timeout table generated by the estimated time of arrival application 200 to flag drivers that potentially have bad ETA/NAT to avoid auto dispatch for the driver. Various reasons may be cause for placing a drive in a timeout, such as too many estimates, bad HoS, and/or manual removal, for example. Too many estimates may include a situation where a driver is placed in timeout if over 40 estimated time of arrival changes occur for a single stop. Bad HoS may include a situation where the driver is placed in timeout because the estimated time of arrival application 200 indicates impossible/illegal HoS for the driver, such as a negative 70-hour timer. Manual removal may include a situation where a driver is timed out manually based on demographics. It is to be understood that the description of these metrics that may place a driver in timeout are illustrative only, and are not meant to be limiting in any regard. The estimated time of arrival application 200 may automatically monitor reason for the timeout of a driver. If new information becomes available, such as a new estimated time of arrival or appointment change, or an update of legal hours of service for the "Bad HoS" timeout, the estimated time of arrival application 200 may remove the driver from timeout.

In some embodiments, the estimated time of arrival application 200 may remove appropriate HoS from a 11/14/70 timer, as well as maintain a minimum DoT timer for the day, to ensure only appropriate timers are reduced based on work type. For example, the estimated time of arrival application 200 may only remove time from a 14/70 timer for work that includes customer dwell time, but from an 11/14/70 timer for work that includes driving. Additionally the estimated time of arrival application 200 may pull recap data from RAIR of a last, predetermined, amount of days and store the recap data in the itinerary by day. The estimated time of arrival application 200 may then check the itinerary each time the current estimate moves past "midnight" on a driver. This may allow the estimated time of arrival application 200 to determine when a driver is receiving more hours on 70 due to recap. Another assumption that may be made during a HoS recap process includes if 0 recap is returned for a date in the recap data, a 34 hour break is assumed at that time, and any recaps prior to that day may be removed.

The estimated time of arrival application 200 may also include an updated throttling method of when to update new ETA/NATs to the TMS. In some embodiments once the estimated time of arrival application 200 determines ETA/NAT for the stop/end of a trip, the estimated time of arrival application 200 then compares current estimated time of arrival in the TMS to the updated ETA. The estimated time of arrival application 200 then evaluates based on variance of estimates, as well as how far out the estimated arrival/NAT is from "now," to determine whether it is appropriate to update the new ETA/NAT to the TMS. Additionally, the estimated time of arrival application 200 may automatically update new ETA, regardless of throttle rules, if the current TMS estimated time of arrival indicates a late arrival for an appointment, and the updated, assumed estimated time of arrival indicates on-time service for the delivery at a stop.

In some embodiments, when the process 300 starts at 305, a location of a driver is confirmed at a starting location of a delivery route, indicating the driver has not departed to begin working. In other embodiments, the estimated time of arrival engine 205 is configured to execute, at least in part, the process 300 at various times throughout a duration of a driver's delivery route. The estimated time of arrival engine 205 is configured to receive (e.g., from an input device 115) instructions on a frequency of executing the process 300, for example, after a predetermined amount of minutes or in response to receiving a notification of an actual arrival update. An actual arrival update may be a notification from a user device of the driver that a driver has arrived at a stop (e.g., a delivery location, a client site, etc.). In a similar regard, an actual departure update may be a notification from a user device of the driver that a driver has left a stop. In some embodiments, tracking information may be received via a network from a GPS device in a mobile device of the driver and/or in the vehicle operated by the driver to confirm actual arrival/departure updates.

In some embodiments, the estimated time of arrival application 200 may be configured to compute a predicted transit estimated time of arrival for each stop on a delivery route. The estimated time of arrival application 200 may also be configured to determine a predicted, final "ETA" to report to a customer, and an earliest time a driver may arrive outside of other constraints, such as an appointment. In some embodiments, the predicted transit estimated time of arrival can be used by the estimated time of arrival application 200 to recognize gaps of underutilized time of a driver. For example, the estimated time of arrival application 200 may calculate a predicted transit estimated time of arrival of 13:00 to arrive at a customer site to make a delivery. However, a delivery appointment may not be scheduled until 19:00. As such, the estimated time of arrival application 200 may determine the amount of hours of underutilized time of drivers and process decisions based on the information. In some embodiments, the estimated time of arrival application 200 may be configured to alter the itinerary for the driver to improve utilization of one or more drivers and/or coordination between the driver and customer. For example, the itinerary may be updated by the estimated time of arrival application 200 to have a day driver drop a shipment for a night driver to finish delivery. Therefore, the day driver may continue a delivery route under another load. As another example, an itinerary may be updated to accommodate an earlier customer appointment request.

In some embodiments, the estimated time of arrival application 200 may be configured to monitor the last time a driver logged working or driving. The estimated time of arrival application 200 may then use this time data to predict how long ago a drivers DoT break started. Additionally, the estimated time of arrival application 200 may be configured to assume a 12 hour break for a driver, unless a 12 hour break will make the driver late for an appointment. These assumptions and predictions can be utilized by the estimated time of arrival engine 205 in computing one or more predicted transit estimated time of arrival at each stop in an overall delivery route. In conventional systems, 10 hour breaks are assumed, as this is what may be legally required as a break for drivers. However, typically drivers may take a 12 to 13 hour break after completing their HoS. As such, the methods and systems described herein may improve accuracy of predicted transit estimated time of arrivals for drivers by adjusting the assumption of the amount of hours taken during a break and tracking of driver's remaining HoS. In some embodiments, the estimated time of arrival application 200 may receive a "Not Available Before" update time from a driver to improve estimates downstream. These updates may allow drivers to input estimated breakdown, maintenance, and/or training time, as well as planned DoT break durations, when deviating from estimated break times (e.g., assumed 12 hour break times).

In some embodiments, the estimated time of arrival application 200 may implement throttling. Examples of throttling rules for the estimated time of arrival application 200 may be the following. If there is less than 4 hours of estimated time of arrival, the estimated time of arrival application 200 may determine the change may be greater than −15 minutes to +7.5 minutes. If there is between 4 to 8 hours of estimated time of arrival, the estimated time of arrival application 200 may determine the change is to be greater than −30 minutes to +15 minutes. If there is greater than 8 hours of estimated time of arrival, but less than or equal to 16 hours of estimated time of arrival, the estimated time of arrival application 200 may determine the change may be greater than −1 hour to +30 minutes. If there is greater than 16 hours of estimated time of arrival, but less than or equal to 24 hours of estimated time of arrival, the estimated time of arrival application 200 may determine the change may be greater than −1 hour to +1 hour. If there is greater than 24 hours of estimated time of arrival, but less than or equal to 48 hours of estimated time of arrival, the estimated time of arrival application 200 may determine the change must be greater than −1 hour to +2 hours. If there is greater than 48 hours of estimated time of arrival, the estimated time of arrival application 200 may determine the change must be greater than −1.5 hours to +3 hours. However, if the TMS estimated time of arrival shows a late arrival against an appointment for a stop, and the updated from the estimated time of arrival application 200 is within the appointment time, the estimated arrival time application may update the estimated time of arrival for on-time, regardless of any throttling rules. The description of these throttling rules are meant to be exemplary only, and should not be regarded as limiting in any manner.

In some embodiments, the estimated time of arrival application 200 may check tracking events in the TMS to confirm whether any estimated time of arrival updates or NAT updates for the specific stop for the estimated time of arrival, or the final shipment for the NAT. The estimated time of arrival application 200 may check for these tracking events after determining an estimate for each stop and the NAT for the final assigned stop. The estimated time of arrival application 200 may not transmit an estimate from specific sources (e.g., a specific one or more of the data sources 210A-210N) or with a specific reason code description. As such, the estimated time of arrival application 200 may leverage human override inputs. For example, an estimate from a "driver related" specific reason code description may cause the estimated time of arrival application 200 to wait on sending the estimate if there is an estimated time of arrival/NAT for that particular update. Furthermore, as the estimated time of arrival application 200 may generate its estimates and determine to update the TMS through tracking events, the estimated time of arrival application 200 may queue tracking event envelopes. Thus, the estimated time of arrival application 200 may ensure one tracking event (TE) update per driver is sent every 15 seconds to the TMS. This may allow the TMS to receive the TE update and effect an update before it receives the next update for the same driver. Without this capability, the TMS may often fail after the first TE update, because the TMS may attempt to apply the downstream estimated time of arrival first, or at the same time, and encounter continuity issues. In other embodiments, the estimated time of arrival application 200 may ensure only one TE update is sent at a time more or less than 15 seconds. It is to be understood that the time values are exemplary only, and should not be regarded as limiting in any manner. In other embodiments, the estimated time of arrival application 200 sends other tracking updates per driver to the TMS. The use of the terminology of TE updates is exemplary only, and is not meant to be regarded as limiting in any way.

In some embodiments, the estimated time of arrival application 200 may determine a frequency of incorrect estimated time of arrival and/or a frequency of change to an estimated time of arrival value at a stop. These values may be monitored by the estimated time of arrival application 200 to determine uncommon frequency changes to estimated time of arrival and/or a high amount of incorrect estimated time of arrival. In response to determining incorrect estimated time of arrival above what is expected, the estimated time of arrival application 200 may output a request to output devices 120 for a human review. In order to facilitate this, estimated time of arrival application 200 may include a fallout process that takes drivers out of the estimation process and may send workflow to operations for a follow-up.

In some embodiments, utilization of the estimated time of arrival application 200 may improve automation of trip planning and estimated time of arrival processes to deliver estimated time of arrival and NATs to drivers using a trip planning tool. This logic may be valuable to convey to drivers when requested in an easy to consume, human language, trip plan. As such, new drivers may be able to see safe, legal, and feasible estimated time of arrival from a trip plan tool of the estimated time of arrival application 200, without understanding what the "plan" was in order to achieve the estimated time of arrival/NATs calculated by the estimated time of arrival application. In some embodiments, the estimated time of arrival application 200 may also convey the "how" of the generated trip plan in addition to the resulting plan. The estimated time of arrival application 200 may also simulate and manipulate the estimated time of arrival calculations, re-run an engine on demand, and receive new results to compare to actual results of estimated time of arrival. Therefore, the estimated time of arrival application 200 may allow testing of new ideas and changes immediately, without waiting for results of the estimated time of arrival to play out in real time and taking a week or more to see impacts.

The various illustrative logical blocks, circuits, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A control processor can synthesize a model for an FPGA. For example, the control processor can synthesize a model for logical programmable gates to implement a tensor array and/or a pixel array. The control channel can synthesize a model to connect the tensor array and/or pixel array on an FPGA, a reconfigurable chip and/or die, and/or the like. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
    computing a transit time for travel of each of a plurality of vehicles, the travel comprising a plurality of stops;
    for each vehicle of the plurality of vehicles and for each stop of the plurality of stops:
        computing a dwell time, wherein the dwell time is computed based at least on one of a type of delivery, a weighted function of a historical dwell time at the stop, or line of service;
        computing an initial predicted transit estimated time of arrival at and departure from the stop based on the dwell time and the transit time for the stop;
        automatically updating the initial predicted transit estimated time of arrival at and departure from the stop, based upon an appointment time at the stop and calculated hours of service of a driver of the vehicle;
        automatically updating the initial predicted transit estimated time of arrival, departure, and next available time for remaining stops of the plurality of stops by computing a delta to the initial predicted estimated transit time of arrival of the remaining stops based on the appointment time for at least one stop of the remaining stops and the calculated hours of service of the driver of the vehicle remaining after the departure from the stop;
        updating the dwell time for the remaining stops based on updated dwell data, the updated dwell data including dwell times correlated by driver and transit leg, wherein updating the dwell time comprises generating, based on the updated dwell data, an estimated activity time for each stop of the remaining stops based on historical dwell times of the driver of the vehicle on transit legs associated with the remaining stops to generate a dwell table including projected dwell times for the remaining stops; and displaying, at a user interface of the vehicle, the updated initial predicted transit estimated time of arrival of the vehicle for at least one of the stop or a next stop of the remaining stops.

2. The method of claim 1, wherein computing of the transit time is based on one or more of distances between the plurality of stops, weather condition, traffic condition, and historical data from a previous trip.

3. The method of claim 2, further comprising determining an average of data received from a first service and a second service to compute the plurality of transit times responsive to determining that a difference in a distance estimate acquired from the data received from the first service and the second service is greater than a threshold distance.

4. The method of claim 1, wherein computing the dwell time based on the weighted function comprises computing a first dwell time for a current date and a second dwell time for a first day following the current date, wherein each of the first dwell time and the second dwell time is based on the historical dwell time of at least one predetermined historical period.

5. The method of claim 1, further comprising computing the initial predicted transit estimated time of arrival for each vehicle of the plurality of vehicles and for each stop of the plurality of stops by adding the dwell time and the transit time.

6. The method of claim 1, wherein updating the initial predicted transit estimated time of arrival, departure, and the next available time for the remaining stops comprises determining at least one of hours of service, break time, or leeway time.

7. The method of claim 1, wherein updating the initial predicted transit estimated time of arrival for each vehicle of the plurality of vehicles and for each stop of the plurality of stops comprises:
determining a number of hours of service remaining in a current user shift of the driver of the vehicle;
determining that the initial predicted transit estimated time of arrival of the stop is greater than or equal to the number of hours of service remaining in the current user shift; and
updating the initial predicted transit estimated time of arrival of the stop by adding a break time to the initial predicted transit estimated time of arrival of the stop.

8. The method of claim 1, wherein updating the initial predicted transit estimated time of arrival for each vehicle of the plurality of vehicles and for each stop of the plurality of stops comprises:
determining a number of hours of service remaining in a current user shift of the driver of the vehicle;
determining that the initial predicted transit estimated time of arrival of the stop is less than the number of hours of service remaining in the current user shift; and
updating the initial predicted transit estimated time of arrival of the stop by adding a leeway time to the initial predicted transit estimated time of arrival.

9. The method of claim 1, further comprising updating an itinerary for travel of each vehicle of the plurality of vehicles from the stop to the next stop based upon an actual time of arrival or actual time of departure at the stop.

10. The method of claim 9, further comprising:
receiving an indication of the actual time of arrival at the next stop without receiving the indication of the actual time of departure from the stop; and
determining the actual time of departure from the stop based upon the actual time of arrival at the next stop.

11. The method of claim 1, wherein updating the initial predicted transit estimated time of arrival for each vehicle of the plurality of vehicles and for each stop of the plurality of stops comprises:
determining that the initial predicted transit estimated time of arrival at the stop is before an appointment start time at the stop; and
keeping the initial predicted transit estimated time of arrival of the stop unchanged upon determining that the sum of the appointment start time and the dwell time is within the hours of service of the driver.

12. The method of claim 1, wherein updating the initial predicted transit estimated time of arrival for each vehicle of the plurality of vehicles and for each stop of the plurality of stops comprises:
determining that the initial predicted transit estimated time of arrival at the stop is before an appointment start time at the stop; and
updating the initial predicted transit estimated time of arrival of the stop upon determining that the sum of the appointment start time and the dwell time is after the hours of service of the driver, wherein updating the initial predicted transit estimated time of arrival comprises adding a break time to the initial predicted transit estimated time of arrival.

13. The method of claim 1, wherein updating the initial predicted transit estimated time of arrival for each vehicle of the plurality of vehicles and for each stop of the plurality of stops comprises:
determining that the initial predicted transit estimated time of arrival at the stop is after an appointment end time at the stop; and
updating the initial predicted transit estimated time of arrival of the stop based upon a leeway time.

14. A non-transitory computer-readable media comprising computer-readable instructions stored thereon that when executed by a processor causes the processor to:
compute a transit time for travel of each of a plurality of vehicles, the travel comprising a plurality of stops;
for each vehicle of the plurality of vehicles and for each stop of the plurality of stops:
compute a dwell time at the stop based at least on one of a type of delivery, a weighted function of a historical dwell time at the stop, or line of service;
compute an initial predicted transit estimated time of arrival at and departure from the stop based on the dwell time and the transit time for the stop;
automatically update the initial predicted transit estimated time of arrival at and departure from the stop, based upon an appointment time at the stop and calculated hours of service of a driver of the vehicle;
automatically update the initial predicted transit estimated time of arrival, departure, and next available time for remaining stops of the plurality of stops, by computing a delta to the initial predicted estimated transit time of arrival of the remaining stops based on the appointment time for at least one stop of the remaining stops and the calculated hours of service of the driver of the vehicle remaining after the departure from the stop;
update the dwell time for the remaining stops based on updated dwell data, the updated dwell data including dwell times correlated by driver and transit leg, wherein updating the dwell time comprises generating, based on the updated dwell data, an estimated activity time for each stop of the remaining stops based on historical dwell times of the driver of the vehicle on transit legs associated with the remaining stops to generate a dwell table including projected dwell times for the remaining stops; and display, at a user interface of a vehicle of the plurality of vehicles, the updated initial predicted transit estimated time of arrival of the vehicle for at least one of the stop or a next stop of the remaining stops.

15. The non-transitory computer-readable media of claim 14, wherein computing the dwell time based on the weighted function comprises computing a first dwell time for a current date and a second dwell time for a first day following the current date, wherein each of the first dwell time and the second dwell time is based on the historical dwell time of at least one predetermined historical period, wherein the initial predicted transit estimated time of arrival is computed by adding the dwell time and the transit time.

16. The non-transitory computer-readable media of claim 14, wherein to update the initial predicted transit estimated time of arrival for each vehicle of the plurality of vehicles and for each stop of the plurality of stops, the processor further executes the computer-readable instructions to:

determine a number of hours of service remaining in a current user shift of the driver of the vehicle;

compare the initial predicted transit estimated time of arrival of the stop with the number of hours of service remaining in the current user shift; and update the initial predicted transit estimated time of arrival of the stop by:

adding a break time to the initial predicted transit estimated time of arrival of the stop upon determining that the initial predicted transit estimated time of arrival of the stop is greater than the number of hours of service remaining in the current user shift; or adding a leeway time to the initial predicted transit estimated time of arrival of the stop upon determining that the initial predicted transit estimated time of arrival of the stop is less than or equal to the number of hours of service remaining in the current user shift.

17. The non-transitory computer-readable media of claim 14, wherein to update the initial predicted transit estimated time of arrival for each vehicle of the plurality of vehicles and for each stop of the plurality of stops, the processor further executes the computer-readable instructions to:

determine that the initial predicted transit estimated time of arrival at the stop is before an appointment start time at the stop; and keep the initial predicted transit estimated time of arrival of the stop unchanged upon determining that the sum of the appointment start time and the dwell time is within an hours of service of the driver, or update the initial predicted transit estimated time of arrival of the stop upon determining that the sum of the appointment start time and the dwell time is after the hours of service of the driver, wherein updating the initial predicted transit estimated time of arrival of the stop comprises adding a break time to the initial predicted transit estimated time of arrival of the stop.

18. A system comprising:

a memory having computer-readable instructions stored thereon; and a processor that executes the computer-readable instructions to:

compute a transit time for travel of each of a plurality of vehicles, the travel comprising a plurality of stops;

for each vehicle of the plurality of vehicles and for each stop of the plurality of stops:

compute a dwell time, wherein the dwell time is computed based at least on one of a type of delivery, a weighted function of a historical dwell time at the stop, or line of service;

compute an initial predicted transit estimated time of arrival at and departure from the stop based on the dwell time and the transit time for the stop;

automatically update the initial predicted transit estimated time of arrival at and departure from the stop, based upon an appointment time at the stop and calculated hours of service of a driver of the vehicle;

automatically update the initial predicted transit estimated time of arrival, departure, and next available time for remaining stops of the plurality of stops, by computing a delta to the initial predicted transit time of the remaining stops based on the appointment time for at least one stop of the remaining stops and the calculated hours of service of a driver of the vehicle remaining after the departure from the stop;

update the dwell time for the remaining stops based on updated dwell data, the updated dwell data including dwell times correlated by driver and transit leg, by generating, based on the updated dwell data, an estimated activity time for each stop of the remaining stops based on historical dwell times of the driver of the vehicle on transit legs associated with the remaining stops to generate a dwell table including projected dwell times for the remaining stops; and display, at a user interface of the vehicle, the updated initial predicted transit estimated time of arrival of the vehicle for at least one of the stop or a next stop of the remaining stops.

19. The system of claim 18, wherein the processor further executes the computer-readable instructions to update an itinerary for travel of the vehicle from the stop to the next stop based upon an actual time of arrival or actual time of departure at the stop, wherein the processor receives an indication of the actual time of arrival at the next stop without receiving the indication of the actual time of departure from the stop, and wherein the processor determines the actual time of departure from the stop based upon the actual time of arrival at the next stop.

20. The system of claim 18, wherein computing the dwell time based on the weighted function comprises computing a first dwell time for a current date and a second dwell time for a first day following the current date, wherein each of the first dwell time and the second dwell time is based on the historical dwell time of at least one predetermined historical period, wherein the initial predicted transit estimated time of arrival is computed by adding the dwell time and the transit time.

21. The method of claim 1, further comprising generating a trip plan for displaying to the driver, the trip plan comprising the initial predicted transit estimated time of arrival, departure, and the next available time of the vehicle, and showing how the initial predicted transit estimated time of arrival, departure, and the next available time of the vehicle is computed.

22. The method of claim 1, wherein updating the initial predicted transit time of arrival, departure, and the next available time comprises updating the initial predicted transit time of arrival, departure, and the next available time at a predetermined frequency.

23. The method of claim 1, wherein updating the initial predicted transit time of arrival, departure, and next available time comprises updating the initial predicted transit time of arrival, departure, and the next available time in real-time.

24. The method of claim 1, further comprising:
displaying, at a customer interface, an updated initial predicted transit estimated time of arrival of the updated initial predicted transit estimated time of arrival of the remaining stops of the plurality of stops.

25. The method of claim 1, further comprising:
transmitting an updated initial predicted transit estimated time of arrival of the remaining stops of the plurality of stops to a fleet tracking system of the plurality of vehicles.

26. The method of claim 1, further comprising:
determining, based on the updated initial predicted transit estimated time of arrival of the remaining stops of the plurality of stops that an appointment needs to be rescheduled.

* * * * *